(12) United States Patent
Zhao

(10) Patent No.: US 12,209,945 B2
(45) Date of Patent: Jan. 28, 2025

(54) SYSTEM AND METHOD TO SELECT AND ISOLATE PARTICLES AND CELLS AND USES THEREOF

(71) Applicant: ENRICH BIOSYSTEMS INC., Branford, CT (US)

(72) Inventor: Qi Zhao, West Hartford, CT (US)

(73) Assignee: ENRICH BIOSYSTEMS INC., Branford, CT (US)

( * ) Notice: Subject to any disclaimer, the term of this patent is extended or adjusted under 35 U.S.C. 154(b) by 0 days.

(21) Appl. No.: 18/603,625

(22) Filed: Mar. 13, 2024

(65) Prior Publication Data
US 2024/0255409 A1 Aug. 1, 2024

Related U.S. Application Data

(63) Continuation of application No. 17/267,888, filed as application No. PCT/US2019/046752 on Aug. 16, 2019, now Pat. No. 11,994,456.
(Continued)

(51) Int. Cl.
*G01N 15/1433* (2024.01)
*G01N 15/1434* (2024.01)
*G01N 15/149* (2024.01)

(52) U.S. Cl.
CPC ..... *G01N 15/1433* (2024.01); *G01N 15/1434* (2013.01); *G01N 2015/1447* (2013.01); *G01N 15/149* (2024.01)

(58) Field of Classification Search
CPC .. G01N 33/60; G01N 33/5005; G01N 33/543; G01N 33/5432; G01N 33/582;
(Continued)

(56) References Cited

U.S. PATENT DOCUMENTS 9,643,184 B2 * 5/2017 Zheng ................. G01N 21/272
9,829,482 B2 * 11/2017 An ..................... G01N 15/1434
(Continued)

FOREIGN PATENT DOCUMENTS

AU    2018213856 A1 *  7/2019  ........... B29C 64/129
CN    105492888 A  *  4/2016  ......... G01N 15/0205
(Continued)

OTHER PUBLICATIONS

Written Opinion of the International Searching Authority and International Search Report for International Application No. PCT/US2019/046752, mailed Dec. 16, 2019 (11 pp).
(Continued)

*Primary Examiner* — Michael P Stafira
(74) *Attorney, Agent, or Firm* — Wiggin and Dana LLP

(57) ABSTRACT

The present disclosure provides, among other things, methods and devices for single cells/particle selection and isolation from a sample in a light-curable biomatrix gel. The individual cells or particles are observed by microscopy and manipulated and isolated by accurately controlling the light transmission from a liquid crystal display (LCD) oriented under the sample to provide a detailed image of the sample. In some embodiments, selected cells or particles are then immobilized by curing the biomatrix gel with blue/violet light transmitted from a LED pixel array. In other embodiments, the selected cells or particles of interest are allowed to remain mobile. In either embodiment, the individual cells or particles of interest are segregated from and isolated from the remainder of the sample.

23 Claims, 15 Drawing Sheets

Related U.S. Application Data

(60) Provisional application No. 62/719,579, filed on Aug. 17, 2018.

(58) Field of Classification Search
CPC .... G01N 21/76; G01N 21/66; G01N 33/5438; G01N 2015/1006; G01N 2015/149; G01N 33/54313; G01N 33/585; G01N 15/1463; G01N 15/1434; G01N 15/1459; G01N 15/1484; G01N 21/253; G01N 33/5011; G01N 15/1475; G01N 1/36; G01N 2015/1415; G01N 2015/1447; G01N 2015/1486; G01N 21/03; G01N 21/6428; G01N 33/487; G01N 33/4915; G01N 33/5091; G01N 33/574; G01N 33/57492; G01N 35/00029; G01N 15/0205; G01N 2015/1493; G01N 33/5008; G01N 33/502; G01N 1/4077; G01N 15/1031; G01N 15/1056; G01N 15/14; G01N 2001/4038; G01N 2015/0065; G01N 2015/1075; G01N 2015/1488; G01N 21/25; G01N 21/272; G01N 2201/10; G01N 2800/26; G01N 2800/52; G01N 2800/7028; G01N 33/54366; G01N 33/563; G01N 33/57484; G01N 1/06; G01N 1/312; G01N 1/38; G01N 15/147; G01N 2001/362; G01N 2015/1472; G01N 2035/00138; G01N 2035/00752; G01N 21/00; G01N 21/6458; G01N 21/6486; G01N 33/53; G01N 35/00009; G01N 1/10; G01N 1/20; G01N 2001/1031; G01N 2021/0325; G01N 2021/0346; G01N 2021/6421; G01N 2021/6471; G01N 2035/00356; G01N 2035/0401; G01N 2035/0429; G01N 21/6408; G01N 21/6452; G01N 21/6456; G01N 21/88; G01N 2201/0221; G01N 2333/47; G01N 2333/705; G01N 2500/00; G01N 33/4833; G01N 33/542; G01N 33/54373; G01N 33/6893; G01N 35/0098; G01N 35/02; G01N 35/025; G01N 1/30; G01N 15/00; G01N 15/1468; G01N 2015/1402; G01N 2035/00326; G01N 2035/00782; G01N 2035/1051; G01N 2201/0628; G01N 2333/4724; G01N 2333/4742; G01N 2333/70546; G01N 2333/70589; G01N 2333/9121; G01N 2400/40; G01N 27/129; G01N 2800/28; G01N 2800/2835; G01N 31/223; G01N 33/5029; G01N 33/5044; G01N 33/5058; G01N 33/5073; G01N 33/5076; G01N 33/533; G01N 33/54353; G01N 33/54393; G01N 33/566; G01N 33/56966; G01N 33/57415; G01N 33/57449; G01N 33/57488; G01N 33/587; G01N 33/68; G01N 33/6803; G01N 33/6842; G01N 33/6857; G01N 33/6872; G01N 35/00; G01N 35/00732; G01N 35/00871; G01N 35/1065

See application file for complete search history.

(56) References Cited

U.S. PATENT DOCUMENTS 10,267,726 B2 * 4/2019 Delattre ............. G01N 15/1492
2003/0184571 A1 10/2003 Hirayama
2004/0125373 A1 7/2004 Oldenbourg et al.
2007/0166816 A1 * 7/2007 Campbell .............. C12M 25/02
    435/288.5
2012/0223217 A1 * 9/2012 Zheng .................. G01N 21/272
    250/215
2013/0210646 A1 8/2013 Kartalov et al.
2014/0038849 A1 2/2014 Mirkin et al.
2014/0186881 A1 7/2014 Walsh et al.
2014/0332382 A1 11/2014 Herr et al.
2016/0041094 A1 * 2/2016 Lei ..................... G01N 15/1433
    250/573
2016/0202460 A1 * 7/2016 Zheng .................... G02B 21/16
    348/79
2017/0321183 A1 11/2017 Yoshino et al.

FOREIGN PATENT DOCUMENTS

| CN | 105492888 | | 8/2018 | |
|---|---|---|---|---|
| EP | 2397859 | | 12/2011 | |
| EP | 2397859 | A1 * | 12/2011 | ....... G01N 33/54326 |
| JP | 2003295114 | | 10/2001 | |
| JP | 2003202848 | | 7/2003 | |
| KR | 20150119334 | | 10/2015 | |
| WO | 0059624 | | 10/2000 | |
| WO | 2011149526 | A2 | 12/2011 | |
| WO | 2014018805 | A2 | 1/2014 | |
| WO | 2018052730 | A1 | 3/2018 | |

OTHER PUBLICATIONS

Cho, S. H., Chen, C. H., Tsai, F. S., & Lo, Y. H. (Sep. 2009). Micro-fabricated fluorescence-activated cell sorter. In 2009 Annual International Conference of the IEEE Engineering in Medicine and Biology Society (pp. 1075-1078). IEEE.

Herzenberg, L. A., Parks, D., Sahaf, B., Perez, O., Roederer, M., & Herzenberg, L. A. (2002). The history and future of the fluorescence activated cell sorter and flow cytometry: a view from Stanford. Clinical chemistry, 48(10), 1819-1827.

Ungai-Salánki, R., Gerecsei, T., Fürjes, P., Orgovan, N., Sándor, N., Holczer, E., ... & Szabó, B. (2016). Automated single cell isolation from suspension with computer vision. Scientific reports, 6(1), 20375.

Liu Y, Sonek GJ, Berns MW, Tromberg BJ. Physiological monitoring of optically trapped cells: assessing the effects of confinement by 1064-nm laser tweezers using microfluorometry. Biophys J. Oct. 1996;71(4):2158-67. doi: 10.1016/S0006-3495(96)79417-1. PMID: 8889192; PMCID: PMC1233684.

Espina V, Heiby M, Pierobon M, Liotta LA. Laser capture microdissection technology. Expert Rev Mol Diagn. Sep. 2007;7(5):647-57. doi: 10.1586/14737159.7.5.647. PMID: 17892370.

Zhao J, Li X, Luo Q, Xu L, Chen L, Chai L, Huang Y, Fang L. Screening of surface markers on rat intestinal mucosa microfold cells by using laser capture microdissection combined with protein chip technology. Int J Clin Exp Med. Apr. 15, 2014;7(4):932-9. PMID: 24955164; PMCID: PMC4057843.

Hamilton NA, Pantelic RS, Hanson K, Teasdale RD. Fast automated cell phenotype image classification. BMC Bioinformatics. Mar. 30, 2007;8:110. doi: 10.1186/1471-2105-8-110. PMID: 17394669; PMCID: PMC1847687.

Gungor-Ozkerim PS, Inci I, Zhang YS, Khademhosseini A, Dokmeci MR. Bioinks for 3D bioprinting: an overview. Biomater Sci. May 1, 2018;6(5):915-946. doi: 10.1039/c7bm00765e. PMID: 29492503; PMCID: PMC6439477.

Leelatian N, Doxie DB, Greenplate AR, Sinnaeve J, Ihrie RA, Irish JM. Preparing Viable Single Cells from Human Tissue and Tumors for Cytomic Analysis. Curr Protoc Mol Biol. Apr. 3, 2017;118:25C. 1.1-25C.1.23. doi: 10.1002/cpmb.37. PMID: 28369679; PMCID: PMC5518778.

Smith GP. Filamentous fusion phage: novel expression vectors that display cloned antigens on the virion surface. Science. Jun. 14, 1985;228(4705):1315-7. doi: 10.1126/science.4001944. PMID: 4001944.

(56) References Cited

OTHER PUBLICATIONS

Bazan J, Całkosiński I, Gamian A. Phage display—a powerful technique for immunotherapy: 1. Introduction and potential of therapeutic applications. Hum Vaccin Immunother. Dec. 1, 2012;8(12):1817-28. doi: 10.4161/hv.21703. Epub Aug. 21, 2012. PMID: 22906939; PMCID: PMC3656071.

Zhou J, Dudley ME, Rosenberg SA, Robbins PF. Selective growth, in vitro and in vivo, of individual T cell clones from tumor-infiltrating lymphocytes obtained from patients with melanoma. J Immunol. Dec. 15, 2004;173(12):7622-9. doi: 10.4049/jimmunol.173.12.7622. PMID: 15585890; PMCID: PMC2174603.

Ferreira MM, Ramani VC, Jeffrey SS. Circulating tumor cell technologies. Mol Oncol. Mar. 2016;10(3):374-94. doi: 10.1016/j.molonc.2016.01.007. Epub Jan. 28, 2016. PMID: 26897752; PMCID: PMC5528969.

Supplementary European Search Report from European Application No. EP19850142; published Apr. 28, 2022.

\* cited by examiner

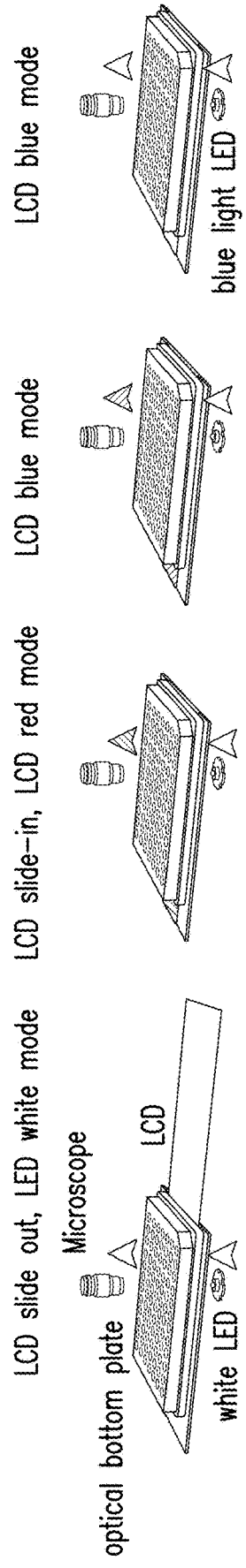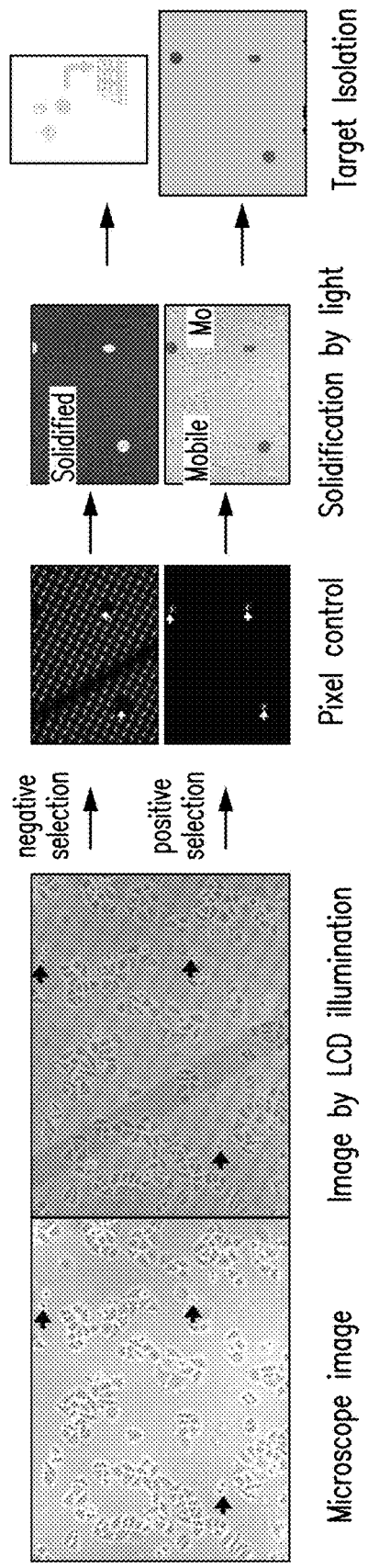

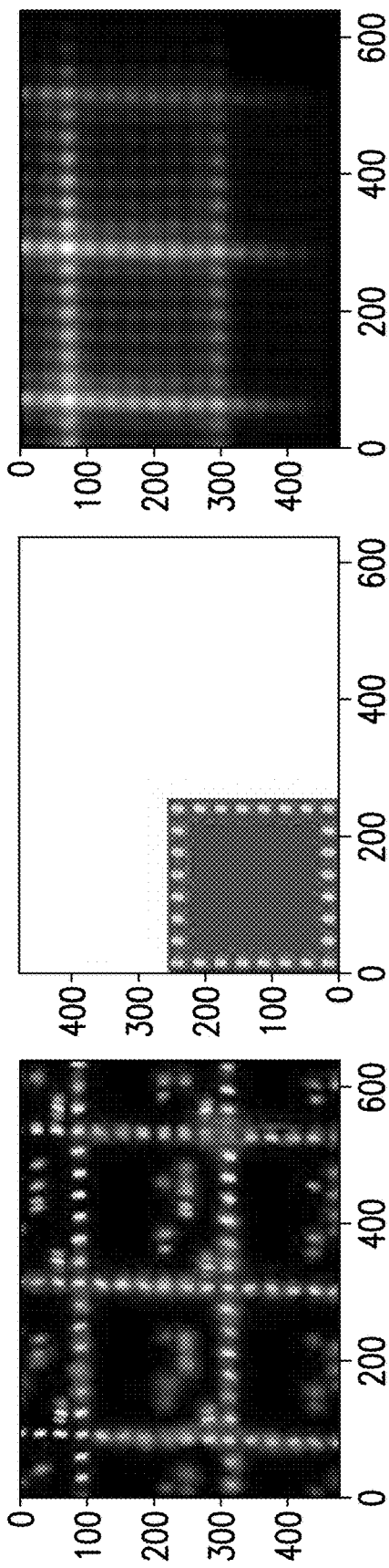
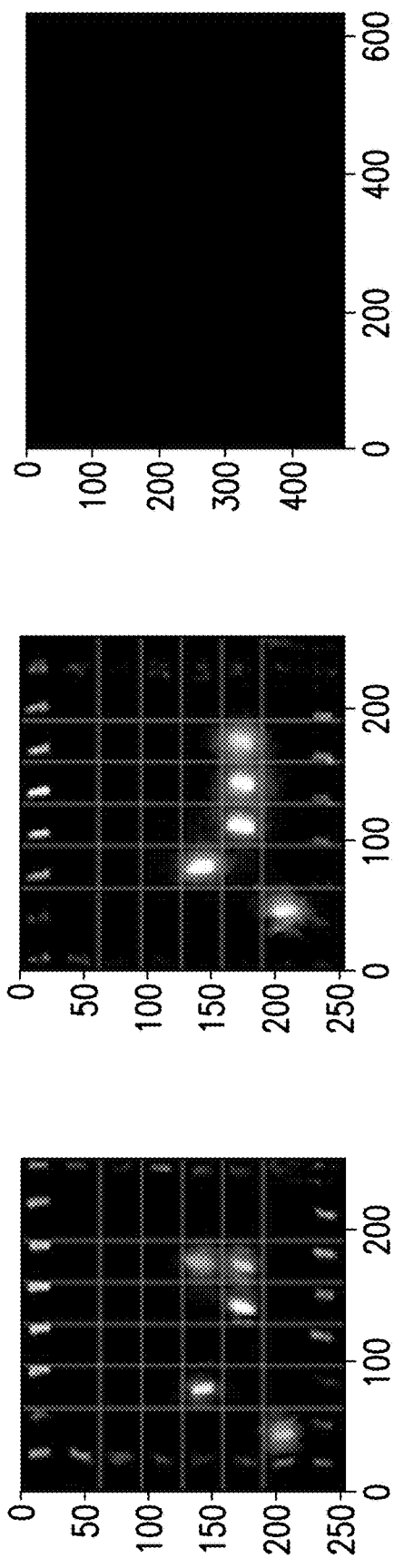
FIG. 4A
FIG. 4B
FIG. 4C
FIG. 4D
FIG. 4E
FIG. 4F

SYSTEM AND METHOD TO SELECT AND ISOLATE PARTICLES AND CELLS AND USES THEREOF

CROSS-REFERENCE TO RELATED APPLICATIONS

This application is a continuation of U.S. patent application Ser. No. 17/267,888, filed Feb. 11, 2021, which is a national phase entry under 35 U.S.C. § 371 of International Application PCT/US2019/046752, filed Aug. 16, 2019, which claims the benefit under 35 U.S.C. § 119(e) of U.S. Provisional Application No. 62/719,579 filed Aug. 17, 2018, all of which are herein incorporated by reference in their entirety.

STATEMENT REGARDING FEDERALLY SPONSORED RESEARCH OR DEVELOPMENT

This invention was made with government support under Grant R43AI147734-01 awarded by the National Institutes of Health. The government has certain rights in the invention.

FIELD OF THE INVENTION

The present disclosure provides, among other things, methods and devices for single cells/particle selection and isolation from a sample in a light-curable biomatrix gel. The individual cells or particles are observed by microscopy and manipulated and isolated by accurately controlling the light transmission from a liquid crystal display (LCD) oriented under the sample to provide a detailed image of the sample. In some embodiments, selected cells or particles are then immobilized by curing the biomatrix gel with blue/violet light transmitted from a LED pixel array. In other embodiments, the selected cells or particles of interest are allowed to remain mobile. In either embodiment, the individual cells or particles of interest are segregated from and isolated from the remainder of the sample.

BACKGROUND OF THE INVENTION

Isolating particles and cells directly under the microscope is still a challenge in the biomedical field. Using microscopy, it is relatively easy to identify cells of specific morphological phenotypes or those interacting with other cell types. However, it is much more difficult to select cells or particles of interest from a sample without employing submicron-precision mechanical instruments and methods (e.g., micro-pipetting, optical tweezers or laser micro-dissection). To facilitate image based single cell and particle isolation from a sample, we have developed a system and method using a LCD pixel array and microscopy, which obviates the need for costly or bulky instrumentation or tedious single cell handling skills. Also, as the capturing process is done by one single overall exposure step, the throughput is greatly enhanced compared with single cell manipulating technologies.

Live single cell isolation technologies have potential value on multiple fronts of life-science research, such as antibody development, primary cell separation, cell line construction, immune cell therapy, and circulating tumor cell (CTC) separation. The major current competitive technologies used to isolate particles or cells are flow-cytometry, microfluidic devices, micro-pipettes, and optical tweezers. An advantage of the present invention is a that it provides a low-cost, robust selection mechanism which enables live cell isolation under challenging scenarios: such as for limited sample sizes, clumpy samples, and adherent cells. For example, flow-cytometry set-ups can be expensive and require significant laboratory space and are not as amenable for the isolation of single cells. In addition, the present invention does not require specific cell markers for labeling nor cell-cell separation. As will become apparent herein, the present invention addresses many of the shortcomings of current technologies for isolating particles or cells from samples such as biological samples.

SUMMARY OF THE INVENTION

Provided herein are methods to track, select and isolate particles or cells using microscopic and LCD technologies.

The present disclosure provides, among other things, methods and devices for single cell or particle selection and isolation from a sample guided by microscopy. In some embodiments, individual cells or particles are manipulated by accurately controlling the light transmission from a LCD pixel located under the sample. In some embodiments, the unselected cells are immobilized by blue/violet light transmitted from an LCD pixel underneath the cells/particles in a light-curable biomatrix gel. In some embodiments, the selected cells are immobilized by blue/violet light transmitted from an LCD pixel underneath the cells/particles in a light-curable biomatrix gel.

Essentially two main embodiments of the present invention are contemplated for performing the isolation. In one embodiment, the particles or cells of interest are allowed to remain mobile, whereas those particles or cells not selected are entrapped or immobilized in a biomatrix, whereby the particles or cells of interest are then separated from those that have been immobilized. In another embodiment, the converse procedure is performed, whereby the particles or cells of interest are entrapped or immobilized in a biomatrix, such that those particles or cells not selected are allowed to remain mobile, whereby the mobile particles or cells are removed from the entrapped particles or cells, which are then collected.

In the embodiment where those particles or cells of interest are allowed to remain mobile, the following steps are involved: (a) particle/cell images will be picked manually and patterns are extracted; (b) The synthesized image is obtained by serial acquisition of images on adjacent regions which are aligned and concatenated; (c) the coordinate of the selected cells are mapped to the very LCD pixel underneath via image alignment; (d) LCD pixels under the cell of interest are darkened and prevent light from passing to the sample, and unselected cells are trapped by the curing of the bioink by blue/violet light emitted from an external LED light source LCD does not have internal light source, we use two external light sources in this invention: a white light LED for imaging, and a UV/violet LED or laser for microgelation]. Selected cells remain mobile and allow for facile elution for downstream applications. In the other embodiment where those particles or cells that are not of interest are allowed to remain mobile, the opposite selection strategy is employed such that only selected cells are illuminated and trapped in a matrix.

In some embodiments the present invention relates to a system for segregating particles, such as particles of interest, from a sample prepared in a light-curable polymeric medium, comprising:
   (a) a light transparent sample plate having one or more receptacles for containing the sample, (b) one or more light sources for illuminating and/or curing the sample, (c) a liquid crystal display (LCD), such as a removeable LCD, for selectively controlling the transmission of light to the sample, (d) a means for aligning the sample plate and the LCD with respect to each other, (e) a means for observing the sample by microscopy, (f) a means for capturing images obtained from the microscopy means of (e), and (g) a microprocessor and software for controlling the system.

In some embodiments the present invention relates to a system wherein said light transparent sample plate (a) is a 96-well plate.

In some embodiments the present invention relates to a system wherein said LCD comprises a rectangular array of pixels.

In some embodiments the present invention relates to a system wherein each pixel of said LCD array comprises two or more sub-pixels.

In some embodiments the present invention relates to a system wherein each pixel of said LCD array comprises a green light emitting sub-pixel, a red light emitting sub-pixel, and a blue light emitting sub-pixel.

In some embodiments the present invention relates to a system wherein each pixel has a dimension of about 60 μm by about 60 μm, and each subpixel has a dimension of about 20 μm by about 60 μm.

In some embodiments the present invention relates to a system wherein said rectangular array of pixels comprises a rectangular array of from about 500 to about 10,000 by about 500 to about 10,000.

In some embodiments the present invention relates to a system wherein said rectangular array of pixels comprises a rectangular array from about 1500 by about 2400.

In some embodiments the present invention relates to a system wherein said one or more light sources are selected from light emitting diode (LED) light sources, lasers, incandescent lights, fluorescent lights, ultraviolet lights, halogen lights, and xenon lights.

In some embodiments the present invention relates to a system wherein said LED light source emits white light.

In some embodiments the present invention relates to a system wherein said LED light source emits white light having a wavelength from about 390 nm to about 700 nm.

In some embodiments the present invention relates to a system wherein said LED light source emits blue/violet light having a wavelength from about 390 nm to about 490 nm.

In some embodiments the present invention relates to a system wherein said LED light source emits green light having a wavelength from about 520 nm to about 560 nm.

In some embodiments the present invention relates to a system wherein aid LED light source emits red light having a wavelength from about 635 nm to about 700 nm.

In some embodiments the present invention relates to a system wherein aid LED light source emits ultraviolet light having a wavelength from about 290 nm to about 390 nm.

In some embodiments the present invention relates to a system wherein said LCD is oriented between said sample plate and said one or more light sources for illuminating and/or curing the sample.

In some embodiments the present invention relates to a system wherein said LCD is located under said sample plate and said one or more light sources for illuminating and/or curing the sample are located under the LCD.

In some embodiments the present invention relates to a system wherein said means for observing the sample by microscopy is located above said sample plate.

In some embodiments the present invention relates to a system further comprising (h) a means for removing segregated particles from the sample.

In some embodiments the present invention relates to a system wherein said means for removing segregated particles from the sample (h) is selected from pipetting, washing, rinsing, suction.

In some embodiments the present invention relates to a system wherein the sample is a biological sample.

In some embodiments the present invention relates to a system wherein the particles are selected from cells, biological particles, beads, extracellular material, and liquid droplets.

In some embodiments the present invention relates to a system wherein said cells are selected from circulating tumor cells (CTCs), blood cells, bacteria, primary cells, transformed cells, pathogenic cells, and rare immune cells.

In some embodiments the present invention relates to a system wherein said light curable polymeric medium is selected from a photo-reactive polymer that demonstrates an increase in viscosity when exposed to a light source having a wavelength from about 290 to about 400 nm.

In some embodiments the present invention relates to a system wherein said light curable polymeric medium is selected from materials selected from the group consisting of photo-initiators, such as gelatin derivatives, poly-ethylene glycol derivatives, alginate and its derivatives, collagen and its derivatives, Pluronic® and its derivatives, and mixtures thereof.

In some embodiments the present invention relates to a system for segregating particles, such as particles of interest, from a sample prepared in a light-curable polymeric medium, comprising:

(a) a light transparent sample plate having one or more receptacles for containing the sample, (b) a light source combination for generating an optic array pattern, (c) a means for aligning the sample plate and the LCD with respect to each other, (d) a means for observing the sample by microscopy, (e) a means for capturing images obtained from the microscopy means of (d), and (f) a microprocessor and software for controlling the system.

In some embodiments the present invention relates to a system wherein said light source combination for generating an optic array pattern is selected from a light projector or an organic light-emitting diode (OLED).

In some embodiments the present invention relates to a method for segregating particles, such as particles of interest, from a sample prepared in a light-curable polymeric vehicle, comprising utilizing a system of the present invention affect the segregation.

In some embodiments the present invention relates to a method for segregating particles, such as particles of interest, from a sample prepared in a light-curable polymeric medium, utilizing a system of the present invention, comprising the steps of:

(a) dispensing the prepared sample into a receptacle of the light transparent sample plate, (b) obtaining a microscopic image of the sample without the LCD between the sample and the light source, (c) obtaining a microscopic image of the sample with the LCD oriented between the sample and the light source, (d) using the microprocessor and software to analyze and align the images obtained from (b) and (d) to obtain a composite image to locate and identify particles in the sample, and (f) using the result from (d) to instruct the microprocessor and software to selectively transmit or not transmit polymer-curing wavelengths of light to the curable polymeric medium at desired locations to provide an array of cured and uncured regions of the polymeric medium to selectively immobilize or not immobilize the particles of interest.

In some embodiments the present invention relates to a method for segregating particles, such as particles of interest, from a sample prepared in a light-curable polymeric medium, utilizing a system of the present invention, comprising the steps of:

(a) dispensing the prepared sample into a receptacle of the light transparent sample plate, (b) obtaining a microscopic image of the sample without the LCD between the sample and the light source, (c) obtaining a microscopic image of the sample with the LCD oriented between the sample and the light source, (d) using the microprocessor and software to analyze and align the images obtained from (b) and (d) to obtain a composite image to locate and identify particles in the sample, (f) using the result from (d) to instruct the microprocessor and software to selectively transmit or not transmit polymer-curing wavelengths of light to the curable polymeric medium at desired locations to provide an array of cured and uncured regions of the polymeric medium to selectively immobilize or not immobilize the particles of interest, and (g) using the means for removing the segregated particles to collect the particles.

In some embodiments the present invention relates to a method for segregating particles, such as particles of interest, from a sample prepared, comprising the steps of:

(a) loading a sample in a photo-sensitive medium;

(b) acquiring one or more images using one or more non-gelation lights;

(c) positioning a display means between the sample and the one or more non-gelation lights;

(d) displaying a pattern on to the display means;

(e) acquiring a composite image using the one or more non-gelation lights;

(f) calculating a location of one or more particles in the sample;

(g) displaying a gelation pattern on to the display means;

(h) forming at least one micro-hydrogel using gelation light; and (i) processing the sample by washing or elution.

In some embodiments the present invention relates to a method wherein the display means is an LCD.

In some embodiments the present invention relates to a method for segregating particles, such as particles of interest, from a sample prepared, comprising the steps of:

(a) loading a sample in a photo-sensitive medium;

(b) positioning a display means between the sample and the one or more non-gelation lights;

(c) displaying a pattern on to the display means;

(d) acquiring a composite image using the one or more non-gelation lights;

(e) calculating a location of one or more particles in the sample;

(f) displaying a gelation pattern on to the display means;

(g) forming at least one micro-hydrogel using gelation light; and (h) processing the sample by washing or elution.

In some embodiments the present invention relates to a method wherein the display means is an LCD.

In some embodiments, light patterns generated by digital micromirror devices can be used in place of the LCD.

In some embodiments, other light sources, such as lasers, can be used in place of the LED.

In some embodiments, light of other wavelengths can be used in place of blue/violet light.

In some embodiments, the image alignment step can be skipped.

In some embodiments, the use of a biomatrix solidifying step can be skipped, when the selected particles or cells are light sensitive.

In some embodiments, any photon responsive hydrogel can be used in place of blue light curable bio-inks.

These and other aspects of the present invention will become apparent from the disclosure herein.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 1 is an example of a schematic workflow of the invention. (A) operation and instrumentation pipeline. (B) microscopic image acquisition of sample only. (C) microscopic image acquisition of sample and LCD (D) selectively dimming or illuminating selected targets (E) light induced microgel-formation and (F) washing or elution of targets. The steps are performed by computer scripts. In particular, (B) the pool of cells is mixed with bluelight curable bioink (Gelatin-MA or peg-MA with biocompatible photo-initiators LAP, or other light sensitive reagent-light combinations), and load on top of LCD illuminated by white light LED. Cells of interest will be picked by hand or by machine learning programs (indicated by black arrows), the microscopic image will be aligned to LCD pixels via intermediate steps (red LCD array illumination) and pixels underneath selected cells will be set as black (C). A short blue light exposure of full well is performed by switching on blue light source and blue-pixel mask (D). For negative selection (top panels of D, E, F) Unselected cells or regions will be solidified (dark regions C), and target cells in mobile phase will be eluted, a strand of human hair is shown as size reference (100 micron in width). For positive selection (bottom panels of D, E, F), cell of interest will be lightened, and trapped by bio-compatible bio-inks, unwanted cells will be washed away, and selected cells remain and potentially cultured in situ.

FIGS. 2A-1 to 2A-4 are perspectives views of an exemplary sample stage:

FIG. 2A-1, is a side view of the sample stage,

FIG. 2A-2, is a front view of the sample stage,

FIG. 2A-3, is a top view of the sample stage, and

FIG. 2A-4 is a perspective view of the sample stage.

FIG. 3B Insert LCD with full pattern displayed, as shown in FIG. 3B, and capture LCD and SAMPLE figure, as depicted in FIG. 3C.

FIG. 3C depicts an exemplary on LCD and capture LCD pattern, ready for image indexing.

FIGS. 4A-4F are examples of indexing pixels. In such examples, the pattern is 6×6 with all border pixels set to 0. The center 4×4 pixels are used for identifying rows and columns. Adjacent patterns have one pixel of separation. In doing so, an 8×8 pattern is used for searching one pattern inside. A red channel is used to represent row, and blue for column.

FIG. 4A depicts an LCD Pattern image including all channels.

FIG. 4BA depicts a border 8×8 pattern for searching the one pattern in FIG. 4A, using only green channel.

FIG. 4C depicts a search result of border pattern, of FIG. 4B, and in FIG. 4A, using a cross correlation map.

FIG. 4D depicts one pattern cropped from a red channel. Binary representation is 0000 0000 1001 0011, which is 147.

FIG. 4E depicts a blue channel. Binary representation is 0000 0000 1000 0111, which is 135, indicating this pattern block locates at the row 147, column 135 of the whole LCD.

FIG. 4F depicts a green channel, as a negative control, in which there should be no signal.

FIG. 5A depicts a positive control: in which the pixels are turned on.

FIG. 5B depicts a negative control: in which the pixels are turned off.

FIG. 7A. depicts published immune cell-tumor cell interactions in cell therapy studies.

FIG. 7B depicts conceptual tumor interacting clone enrichment process by selection under microscope method. Tumor cell as thick edged entity, irrelevant T cells in white, and tumor-binding T cells in gray.

DETAILED DESCRIPTION OF THE INVENTION

Definitions

Figures 1, 2, 2A:
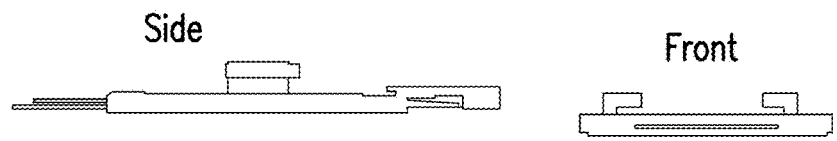
Figures 2, 2A, 3, 4:
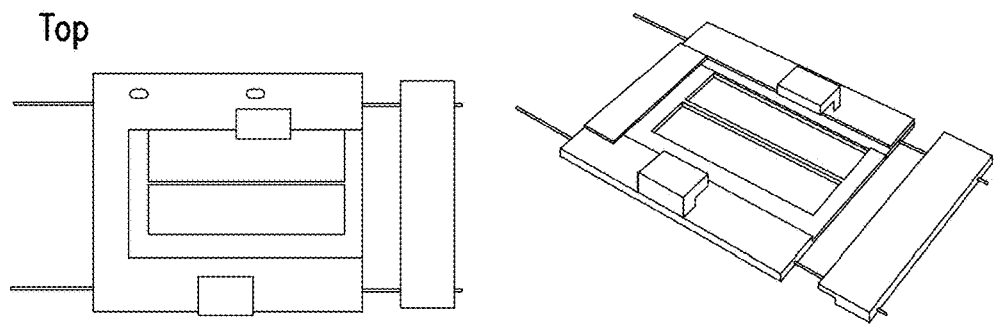

In order for the present invention to be more readily understood, certain terms are defined below. Additional definitions for the following terms and other terms are set forth throughout the specification.

Affinity regent: As used herein, the term "affinity reagent" is any molecule that specifically binds to a target molecule, for example, to identify, track, capture or influence the activity of the target molecule. The affinity reagent identified or recovered by the methods described herein are "genetically encoded," for example an antibody, peptide or nucleic acid, and are thus capable of being sequenced. The terms "protein," "polypeptide," and "peptide" are used interchangeably herein to refer to two or more amino acids linked together.

Bioink means: bioink materials that mimic an extracellular matrix environment to support the adhesion, proliferation, and differentiation of living cells, they are normally derived from biocompatible polymers such as gelatins, alginates, fibrin, chitosan, PEG, and hyaluronic acids.

Bio-matrix: the cross-linked or solidified form of a bio-ink.

Hydrogel means: a macromolecular polymer gel constructed of a network of crosslinked polymer chains. Hydrogels are synthesized from hydrophilic monomers by either chain or step growth, along with a functional crosslinker to promote network formation.

Systems and Methods

Various aspects of the invention are described in detail in the following sections. The use of sections is not meant to limit the invention. Each section can apply to any aspect of the invention. In this application, the use of "or" means "and/or" unless stated otherwise.

The present disclosure provides, among other things, methods and compositions for generating antibodies against a functional epitope of a target protein. The generation of antibodies that target a functional epitope of a target protein allows the antibody to modulate the target protein's function. For example, the ability to target a functional epitope allows the antibody to agonize or antagonize the target protein's function. In some embodiments, the methods provided herein use ligand-conjugated antibody libraries for the development of antibodies that can modulate a target protein's function.

With previously available fluorescence activated cell sorting (FACS) or microfluidics-chips based cell isolation tools (1, 2) generate thin fluidic streams and interrogate single cells, and isolate cell subpopulations based on certain numeric features. However, information of cell phenotypes and cell-cell interactions are lost. Other image based single cell picking techniques such as micro-pipetting (3), optical tweezers (4) or laser capture-microdissection (5, 6) require high-precision mechanical instrumentations and the individual capture action of each cell which decreases throughput and hinders commercialization. The fast-growing consumer electronics industry has pushed liquid crystal displays (LCDs) down to the order of single cell resolution, i.e. a single color pixel diameter of a 2K 5.5-inch display is around 30-50 m, or approximately the cross-width of a mammalian cell. Wavelength-selective pixel arrays on LCDs can be programed to form temporal-spatial patterns. Furthermore, image-based particle recognition and partitioning algorithms (7) have been applied due to the advances of machine learning techniques.

Biocompatible three-dimensional (3D) printing inks, that is materials that mimic an extracellular matrix environment to support the adhesion, proliferation, and differentiation of living cells, are normally derived from biocompatible polymers such as gelatins, alginates, fibrin, chitosan, PEG, and hyaluronic acids (8) that can be cured or solidified by visible light are also available. These materials can yield >90% cell viability that matches commercial cell sorters i.e. FACS and microfluidics-based sorters. As the capturing process can be performed by a single overall exposure step, the throughput of this technology is largely enhanced.

The isolation of primary cells (9) such as lymphocytes, neurological cells, muscle cells, stem cells, etc. is critical in research, diagnostics, and therapeutic applications. The current workflow includes tissue digestion, debris removal and flow cytometry. The debris removal step can cause major loss (e.g., about 70%-90%) of viable cells but is required for fluidics-based systems because of clogging risks. Because the technology of the present invention is not fluidics based, it can therefore tolerate the presence of tissue debris and clumpy cells. Because the systems and methods of the present invention can be applied directly to digested samples and those generating single live cells, the present invention largely reduces the quantity of samples required.

In the present invention, for cell engineering, specific genes or regulatory DNA elements are inserted into the cell genome. This insertion can induce a change in the cellular phenotype, i.e. reporter gene expression and surface protein display. In contrast, current engineering technologies such as genomic manipulations are mostly random or less controlled, yielding a pool of heterogeneous cells. Therefore, isolating live single cells with an optimized phenotypical readout is a critical step of the entire engineering process. In current methods, the isolation process is performed mostly using flow-cytometry. However, these current methods requires relatively large quantities (hundreds of thousands of cells) of starting materials and laborious down-stream operations such as serial dilution, culturing and validation, which can take months to perform. In contrast, with the present invention, it is feasible and cost effective to isolate the exact clone desired right under the microscope in as short a time as just a few hours, from limited starting samples, such as just a few hundred to several thousand of cells.

For hybridoma selection, a mixture of cell clones displaying different antibodies usually serves as the starting material for single clone isolation. Conventional cell engineering, flow-cytometry or microfluidic devices have been used for selecting the clone with the strongest antigen affinity. This current practice requires relatively large quantities (hundreds of thousands of cells) of starting materials and laborious down-stream operations such as serial dilution, culturing and validation, which can take months to perform. In contrast, with the present invention, it is feasible and cost effective to isolate the exact clone desired right under the microscope in as short a time as just a few hours, from limited starting samples, such as just a few hundred to several thousand of cells.

The process of phage display (10, 11) is used to isolate binders specifically binding to target an antigen that is either coated to a substrate, i.e. plates, beads, or that is expressed on a cell. Nevertheless, these current methods normally require milligrams of purified proteins (which is expensive and tedious to obtain) to coat plates or tens of millions of cells to process through FACS. Researchers have long been searching for an ideal platform not limited by the antigen quantity. The invention enables selection of beads conjugated with various biomolecules for purposes such as antibody discovery and sample enrichment in diagnostics.

In cell therapy treatments for cancer patients, tumor killing clones (12) first have to be separated from a tumor sample from the patient. This process involves crude sorting, and high-throughput single cell cultures. The efficacy of functional clones is then identified by microscopically observing the tumor cell killing in tumor cell-T cell cocultures. With the present invention, having the ability to directly identify and select T cell clones that bind and induce tumor cell morphological changes immediately from the original pool will largely speed up the process.

For circulating tumor cells (CTC) separation, different parameters such as surface markers or cell sizes can be used (13). The former technology isolates circulating tumor cells by staining the cells with tumor specific surface markers and applying the cell mixture into fluidics-based stream, where each cell is interrogated. Cells bearing the specific fluorescent marker are then separated and pooled. This method is size-based. Whole blood or preprocessed blood samples are applied to a single beam of liquid where the size of each cell is detected and CTC-sized cells are collected. Because just a milliliter of blood contains more than 109 red blood cells compared to a few CTCs, the interfering bloods cells pose challenges of device clogging and require sample preprocessing. The present invention uses fast imaging acquisition and a fluidics-free capturing mechanism, which is ideal for standardized CTC detection, isolation and characterization.

Figure 8:
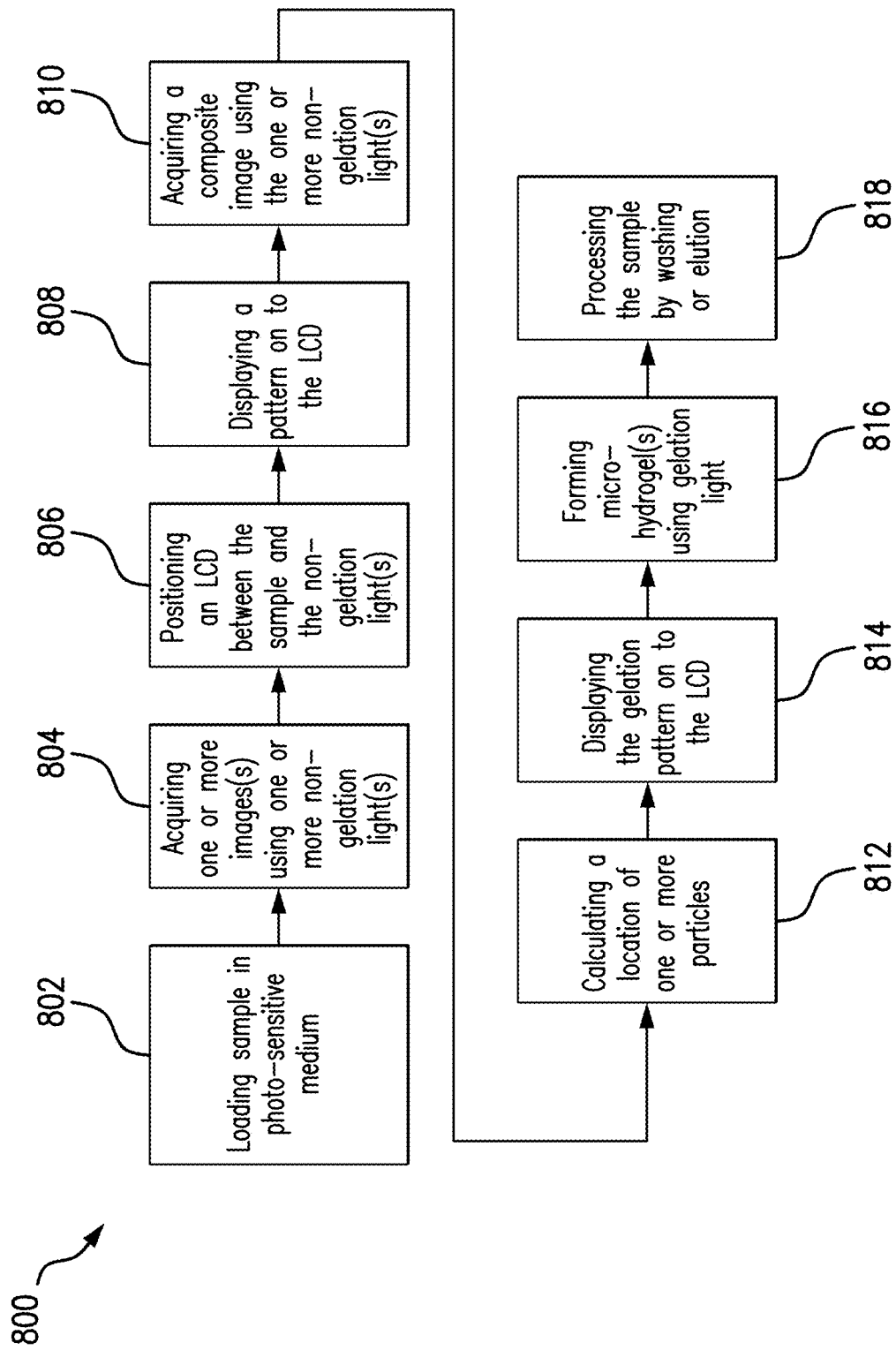
FIG. 8 depicts a flow chart of an exemplary method starting from LCD-free sample images, according to an aspect of the present disclosure.

FIG. 8 depicts a flow chart of an exemplary method 800 starting from LCD-free sample images, according to an aspect of the present disclosure. The exemplary method begins at an initial step 802. At step 802, a sample, as taught herein, may be loaded into a photo-sensitive medium. At a next step 804, one or more images may be acquired by using one or more non-gelation lights. At a next step 806, as shown, an LCD may be positioned between the sample and the one or more non-gelation lights. It can be appreciated that the LCD does not have to be directly positioned below or above the sample, but can be spaced away from the sample. In some embodiments, the LCD and/or the light source combination may be substituted with any device that can generate an optic array pattern, such as, for example, a light projector, OLED, etc.

At a next step 808, a pattern, as taught herein, may be displayed on to the LCD, or any other suitable device, as taught herein. Once the pattern is displayed, at a next step 810, a composite image may be acquired using the one or more non-gelation lights. At a step 812, the location of one or more particles, as taught herein, may be calculated. At a next step 814, a gelation pattern may be displayed or projected on to the LCD, or any other suitable device, as taught herein. Once the gelation pattern is displayed, at a step 816, micro-hydrogel(s) may be formed using gelation light. Once these micro-hydrogel(s) are formed, the overall sample may be washed or eluted in a post-processing step 818. In an exemplary embodiment, washing may be used to process the sample to target in the immobile microgel. By immobile, in a not mobile phase. In another exemplary embodiment, elution may be used to target in the mobile phase.

Figure 9:
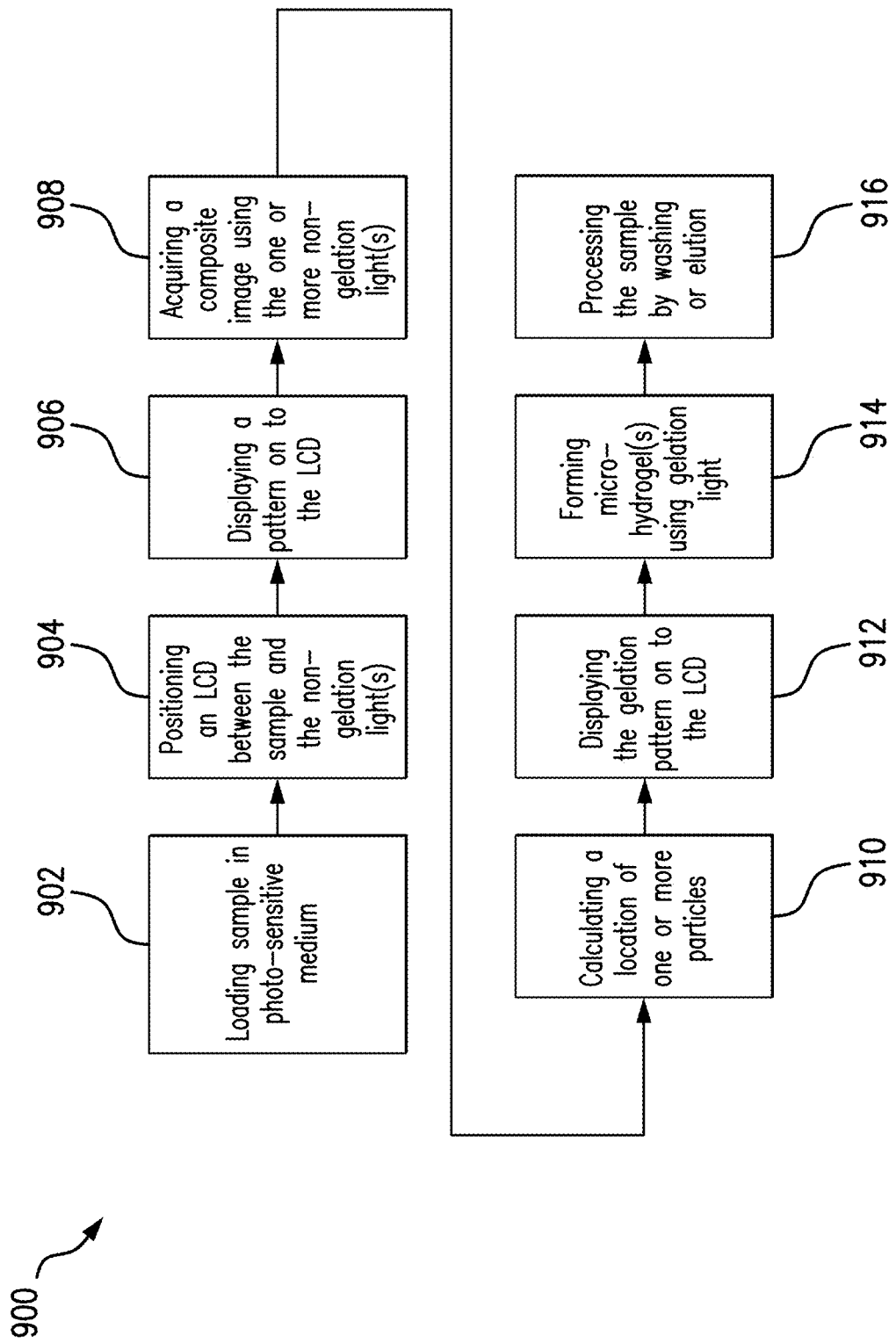
FIG. 9 depicts a flow chart of an exemplary method using only LCD-sample composite images, according to an aspect of the present disclosure.

FIG. 9 depicts a flow chart of an exemplary method 900 according to an aspect of the present disclosure. Method 900 uses only LCD-sample composite images. Method 900 does not require the step of acquiring one or more images using one or more non-gelation lights. Method 900 is similar with respect to the other steps of previously described method 800 and will not be repeated for purposes of brevity.

Figure 10:
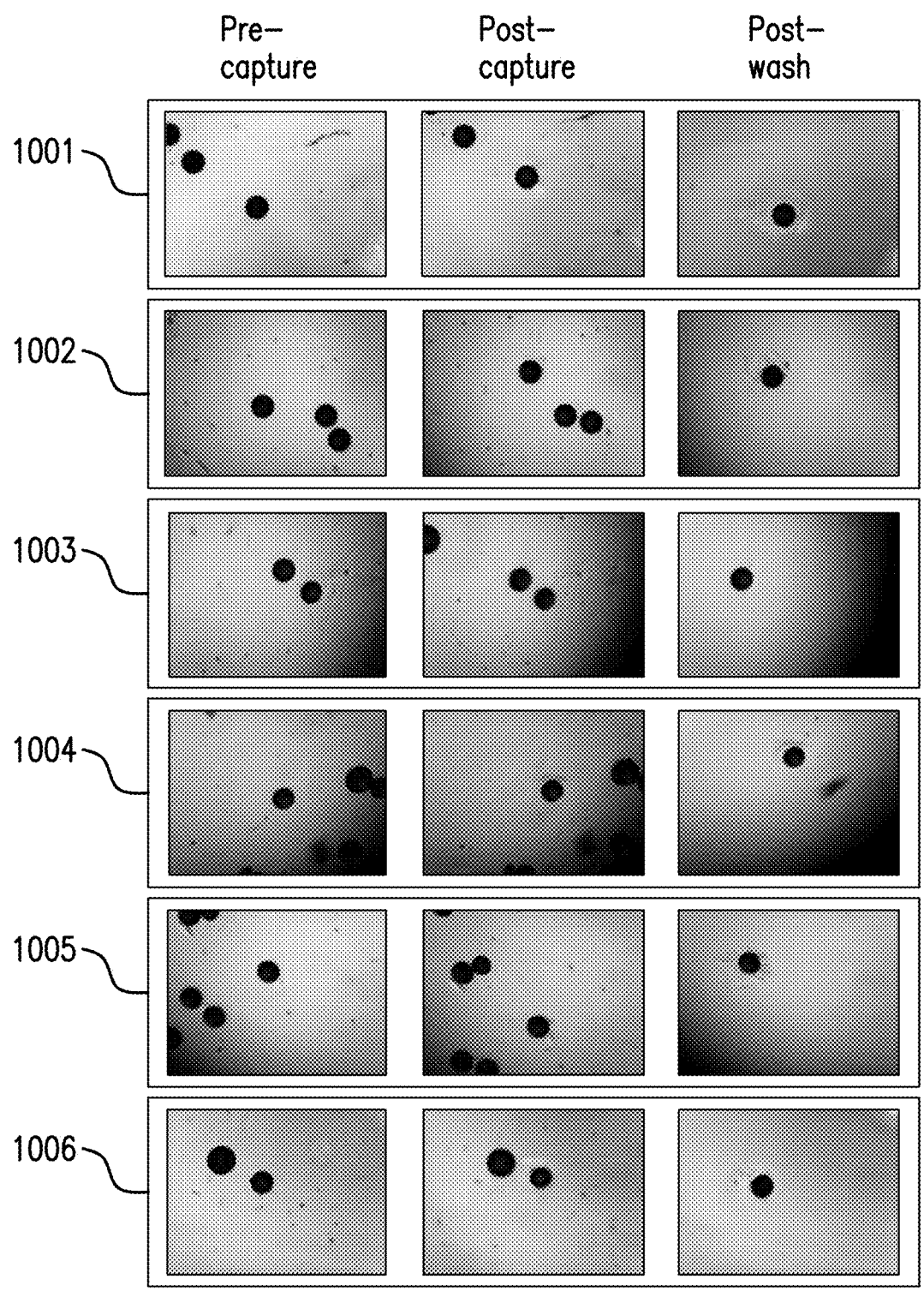
FIG. 10 depicts exemplary images of particle capture results.

FIG. 10 depicts exemplary images of particle capture results, and according to aspects of the present disclosure. As shown, the pre-capture, post-capture, and post-wash images are illustrated with respect to six (6) different iterations, 1001, 1002, 1003, 1004, 1005, and 1006, according to an exemplary process taught herein.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

Example 1—Selective Darkening of LCD Pixels Underneath a Bead

Figure 2B:
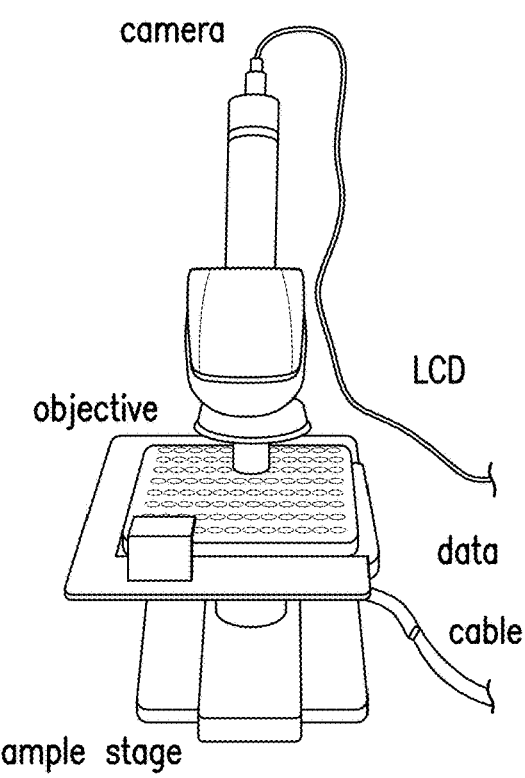
FIG. 2B is an example of exemplary instrumentation, according to an embodiment of the present disclosure, including: LCD, sample stage, 96 well optical bottom microtiter plates, and a bench upright microscope.

Hardware setup: microscope, LCD-sample stage, as depicted in FIGS. 2A-1 to 2A-4, computer. Optics of the system consists of an up-right microscope, Image requisition as well as masking is achieved by a 5.5 inch TFT LCD (2560×1440 resolution). For prototype, the mechanical setup that enables inserting and extracting LCD is performed by ABS printed sample stage, as depicted in FIG. 2B. Image processing and LCD and LED control is performed by a personal laptop. The utilization of 96 well-microtiter plates enables the potential to be motorized for high throughput applications.

Figure 3A:
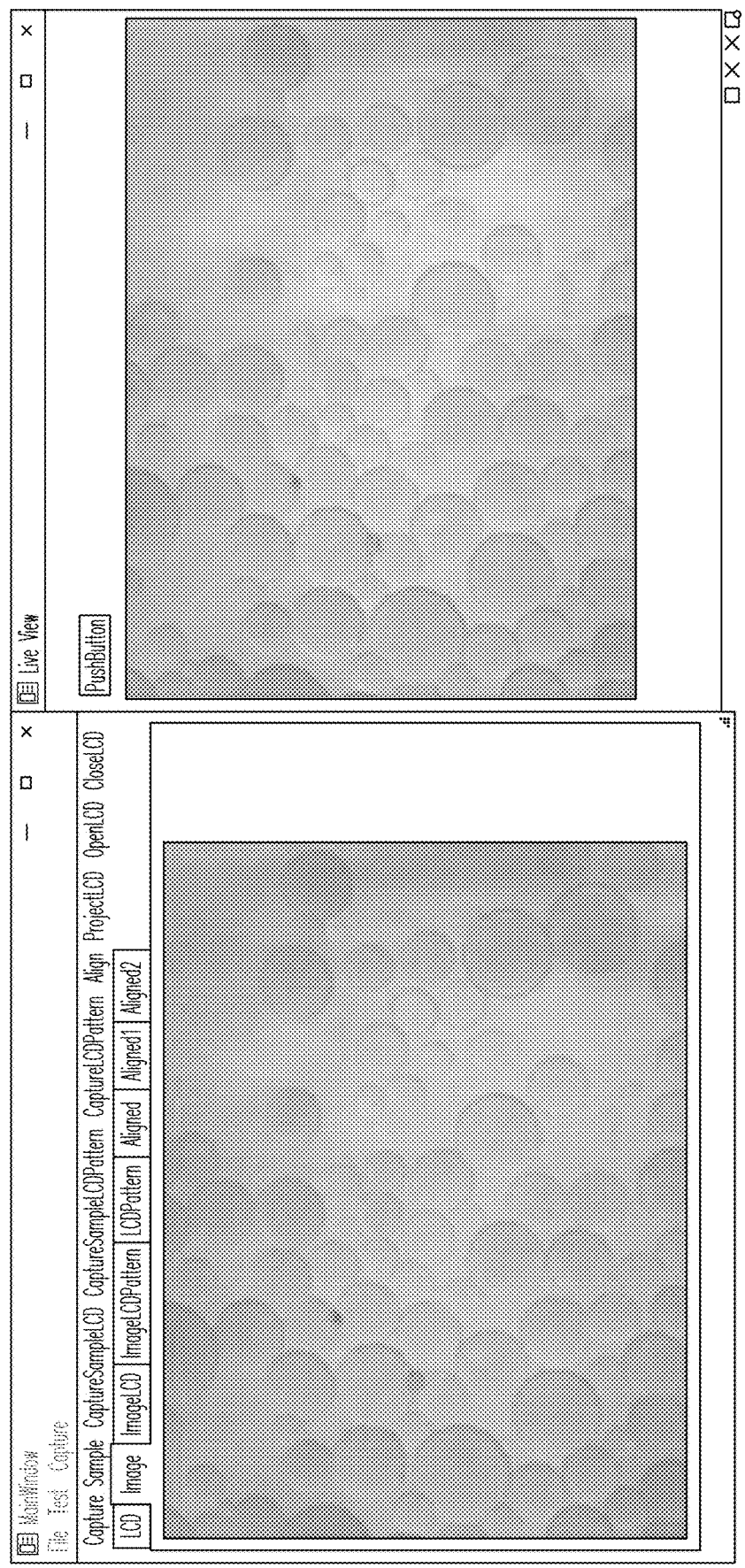
FIG. 3A-3C depicts an image where a sample only figure is taken, and cell of interest is selected, no LCD insert yet.
Figure 3B:
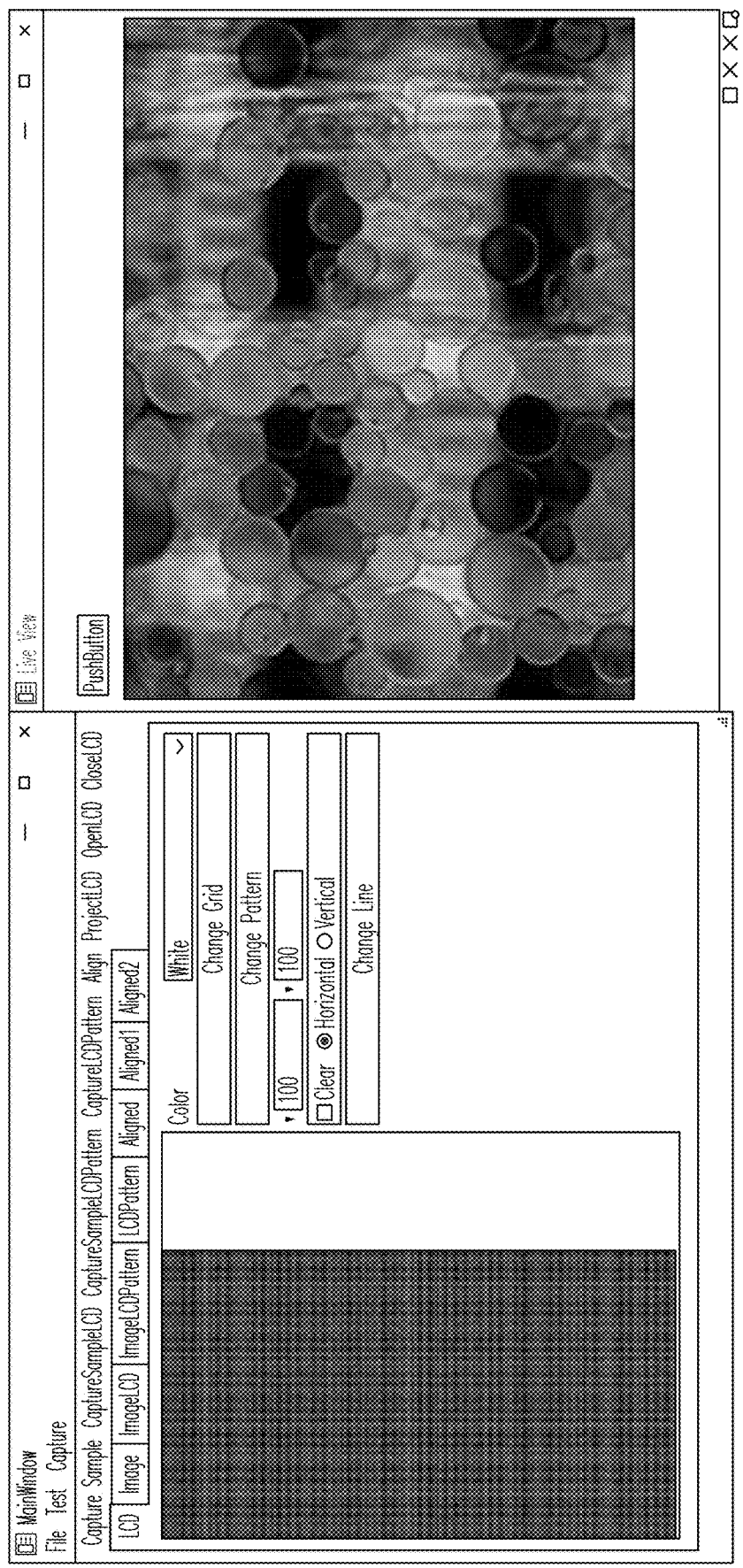
Figure 3C:
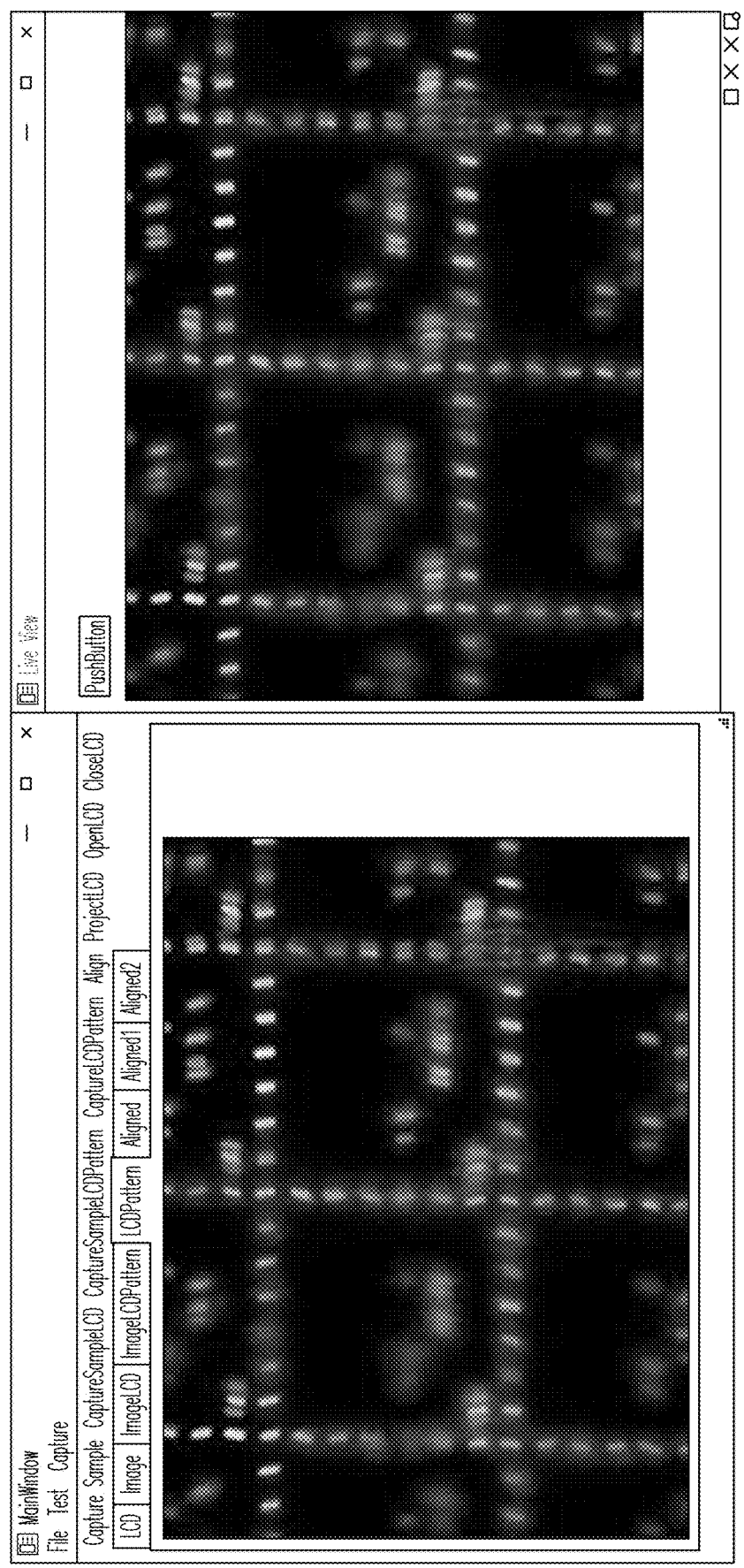

Software setup: image capturing, sample-LCD alignment, pattern recognition, particle picking. An image acquisition, processing and particle manipulation control software is prototyped by python programming language. The major challenge is to accurately address the underlying LCD tile under each particle of interest. To achieve this, several images are obtained for each area of interest. An image with no LCD installed is taken as a traditional microscopic image, as shown in FIG. 3A, as well as an image with LCD installed, as shown in FIG. 3B. A pattern is displayed on LCD (as discussed below) and the sample with LCD pattern is acquired, as shown in FIG. 3B. Finally, the microscope is focused on LCD and the pattern of LCD is imaged, as depicted in FIG. 3C. Due to the setup of the image acquisitions, the images might produce shift due to the installation of the LCD panel and change of defocusing.

To get the location of a cell on LCD panel, which is used to turn on or off the desired pixel of the cell, the indices of each point on LCD image needs to be calculated. The patterns are used to identify the LCD image location corresponding the LCD panel, which is described in following contexts. The location of each pixel is described as point on a cartesian system. Origin and unit vectors of the coordinate system is calculated by finding peaks in reciprocal space. The location of each pixel is calculated. The position of area of exposure on LCD is identified by pattern. Due to the exposure area being very small compared to the LCD panel, it is not trivial to use one pattern to identify the location. To overcome this limitation, a 6×6 pattern is generated for each 8×8 pixel2 on LCD. The background of the LCD panel is set to the desired color. For each pattern, the peripheral of the square is turned off, and the center of the 4×4 pixels are used to identify the row and column of this pattern on LCD. In the current setup, the LCD has 2560×1440 pixels. There are 366×206 patterns, which could be indexed with 17 pixels. A pattern frame with white pixels, as depicted in FIG. 3C, in peripheral is used as template to find pattern from original image, as shown in FIG. 4A. A cross-correlation map is calculated between the pattern frame and LCD pattern image. Using the best alignment, the pattern is cropped from the original LCD pattern, as shown in FIG. 4B, and the row and column index of the pattern is identified by mapping center 4×4 pixels as binary numbers, as shown in FIGS. 4D, 4E, and 4F.

Figure 5A:
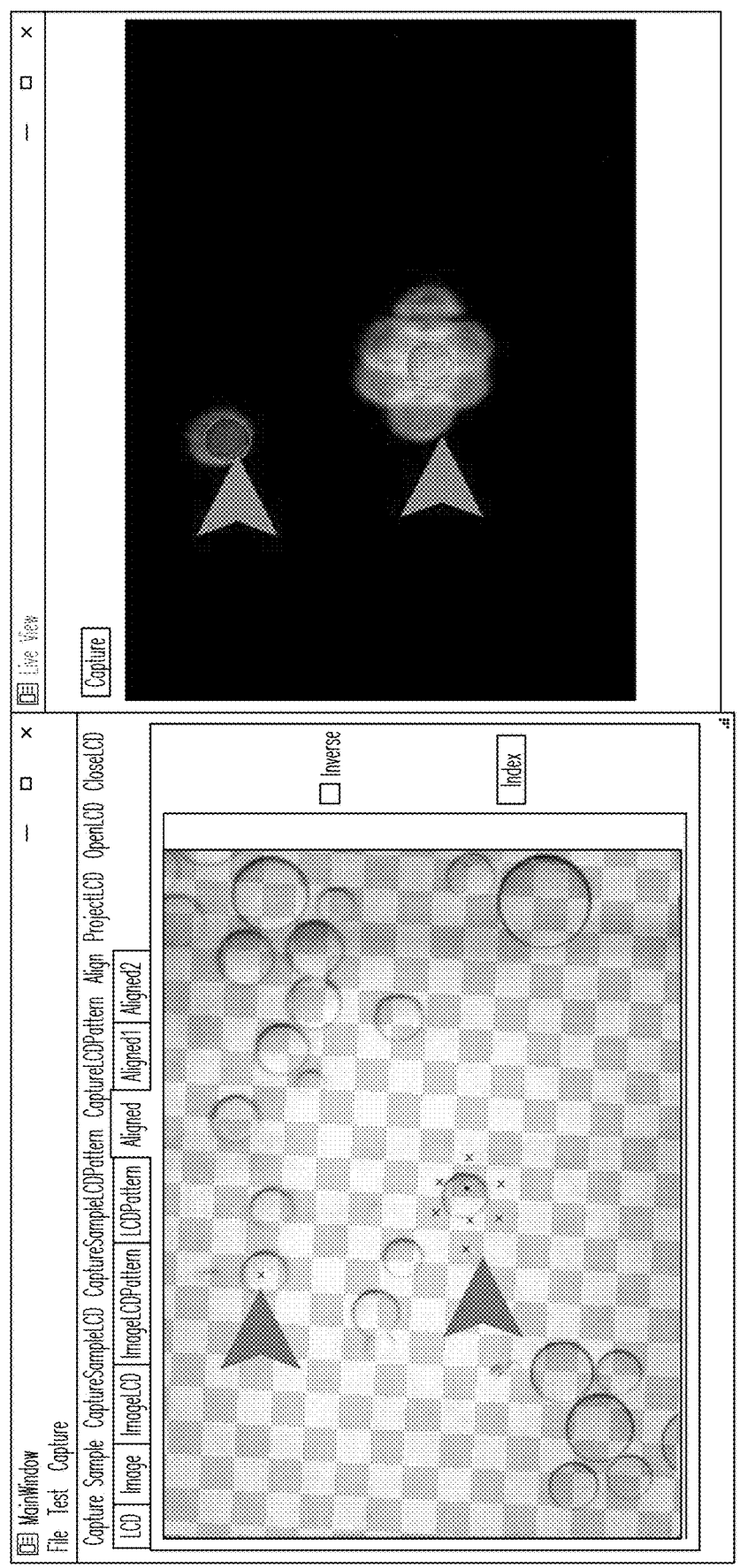
FIGS. 5A-5B depict accurate LCD pixel control. After directly selecting particle of interest on the microscope images (left panel), the live image showed the LCD pixels underneath single beads (labelled with a red arrow) are turned-on or off.
Figure 5B:
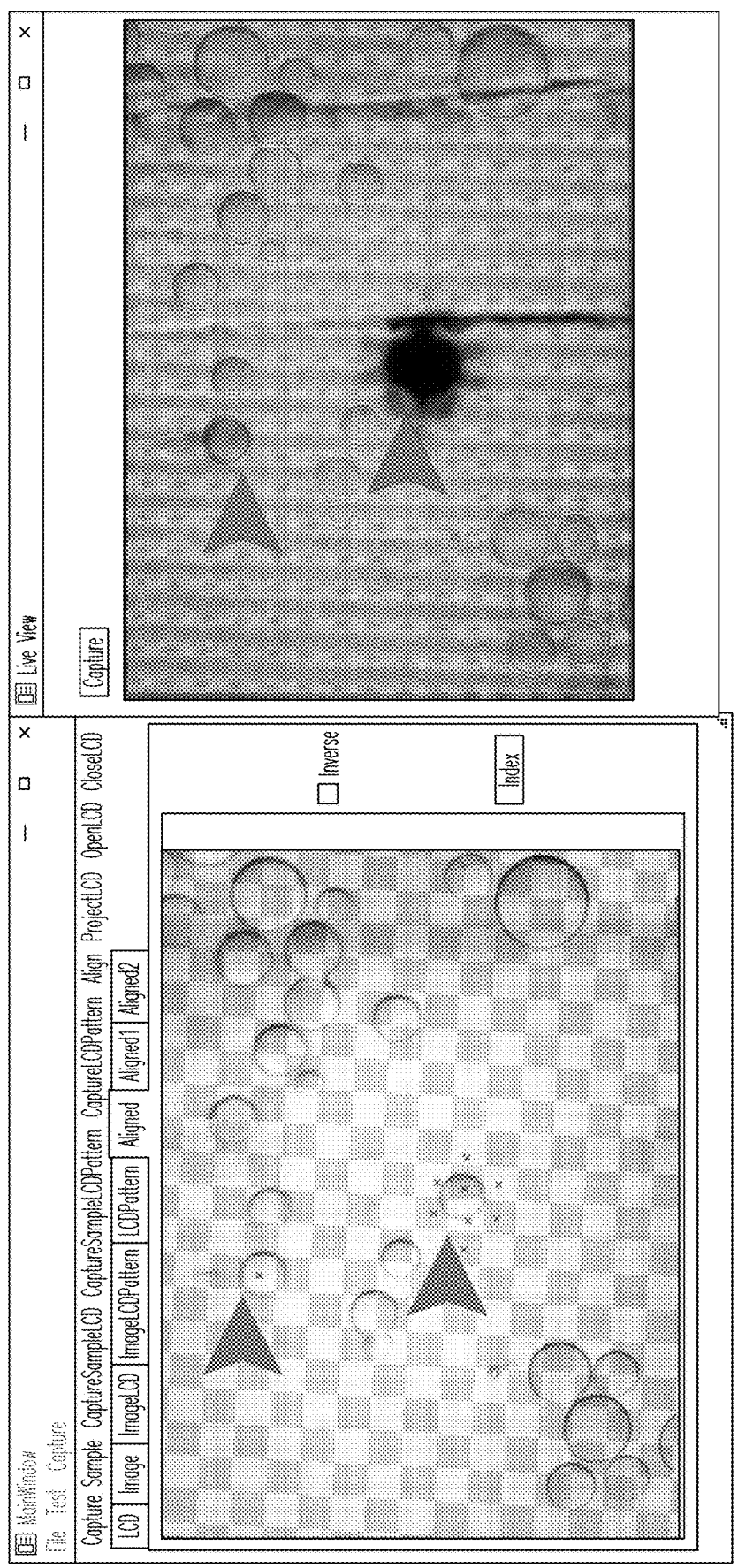

The absolute addresses of the LCD tiles were indexed by the patterns displayed on LCD, which will serve as the reference to calculate any particle picked at the original bright-field images. To generate a dynamic mask for cell sorting. the particle of interest will be selected by either dimming, as shown in FIG. 5B, down the underlying LCD tile for negative trapping or by selective brighten the LCD tile for positive trapping as shown in FIG. 5A. To test the image alignment and pixel trapping, we used a commercially available beads with diameter of 30-200 micron, and demonstrated that our prototype system can align images, detect particles and control the transmission of the underlying LCD tile without error.

Example 2—Red Blood Cells Removal

In contrast to fluorescence-activated cell sorting (FACS), which is a specialized type of flow cytometry or a microfluidic separation method, the technology of the present invention physically confines the cell selection and separation process inside air tight microtiter wells. The limited biohazard exposure makes selection-under-microscope an ideal process for liquid biopsies. Circulating tumor cells (CTCs) analysis is a powerful tool for liquid biopsies to diagnose and phenotype cancers and prognose treatment. The relatively low abundance of CTCs makes it challenging to isolate them from surrounding red blood cells (RBCs). Even after bulk enrichment steps—such as Ficoll, lysis—significant numbers of red blood cells often remain and prohibit effective downstream analysis of CTCs including: poor loading efficiency for single-cell and physically blocking the growth of rare cells.

RBC displays distinct color and morphology in bright field microscope images, which can be easily picked by pattern recognition algorithms. We will use this application as a proof-of-concept experiment to optimize the individual steps of our system: automatic cell picking, whole-well panorama synthesis and photon-polymerization.

Experimental Design and Outcome. (A) sample preparation and image acquisition. To imitate CTC samples with varying RBC contamination levels. We will spike RBC cells (mouse red blood cells, HeLa ATCC® tib-112™) into cultured Hela cells (HeLa ATCC® CCL-2™) at levels of 1:0, 1:10, 1:100 and 1:1000. 3000 cells will be loaded to single wells of optical bottom microtiter plate. For each well, 10 partially overlapping bright field microscope images will be collected, the last image will be used for alignment. Each image pixel on the last image is aligned to LCD absolute coordinates while will be used for LCD pixel mapping. (B) Whole well image synthesis and automatic cell picking. A composite image covering the whole well will be synthesized, image pixels positions on the whole well panorama will be calculated and mapped to LCD coordinates using the last image as a reference. 100 80×80 single cell image square will be picked from RBC only images as training dataset for machine learning algorithm (python sci-image module). And all particles on the panorama will be picked and categorized to RBC or "non-RBC". The centroid coordinates of RBCs will be recorded and the nearest LCD pixels underneath will be calculated for selective illumination or darkening. To verify the accuracy of sample-LCD alignment, validating LCD control image will be generated, where only RBC will be illuminated. (C) Light exposure time optimization and bioink selection. Curing radius and curing depth are function of UV dose and photon-initiator concentrations. Different bioink compositions also have different physical properties including solubility and viscosity. For LCD, different photon energy (wavelength) will also affect rate of photopolymerization. Commercially available bio-ink compositions were tested under five 10 W UV LED (photon intensity peak at wavelengths: 365 nm, 390 nm, 395 nm, 400 nm and 410 nm respectively, as 5 degree 0.1 cm$^2$ flux beam) illumination gelatin-MA based (Igcure and IAP), and PEG-MA (Igcure and IAP). Optimal condition of gelation will be those yielding non-diffusing curing disks with a radius of 20-30 microns. (D) cell retrieval and viability of HeLa cells. After RBC removal, a sticky edge microtiter plate will be attached to the sample plate, and cells retained in mobile phase will be spin collected to the collection plate by low speed centrifugation (300 rpm). Collected cells will be resuspended and cell viability will be verified with Trypan Blue stain and compared with control cells skipping sorting steps.

Example 3—Phage Display on Single Cell/Bead

Phage display is a powerful method for affinity agent development. Compared with other in-vitro display methods (ribosome display, mRNA display), Phage display is robust for antigens in various formats: beads, plates or even whole cells. Nevertheless, bulk panning methods requires high amount of antigen (milligrams of protein or millions of cells) which increase its cost significantly. Our selection technology requires only a couple of beads or cells. Therefore, the required antigen can be produced in house, using small scale in-vitro translation kits or transient expression of mammalian cell lines. Prior to the start of the proposal, we will construct a naïve camel heavy chain library and screen it on a couple of targets (EGFR, TIGIT, PD1 and BCMA) involved in tumor immune therapy using our selection under-microscope pipeline. Four genes including transmembrane domains will be cloned to transient expression vector pTT5, transduced to HEK293FS cells. Cell pools will be aliquoted for liquid nitrogen storage.

Figure 6A:
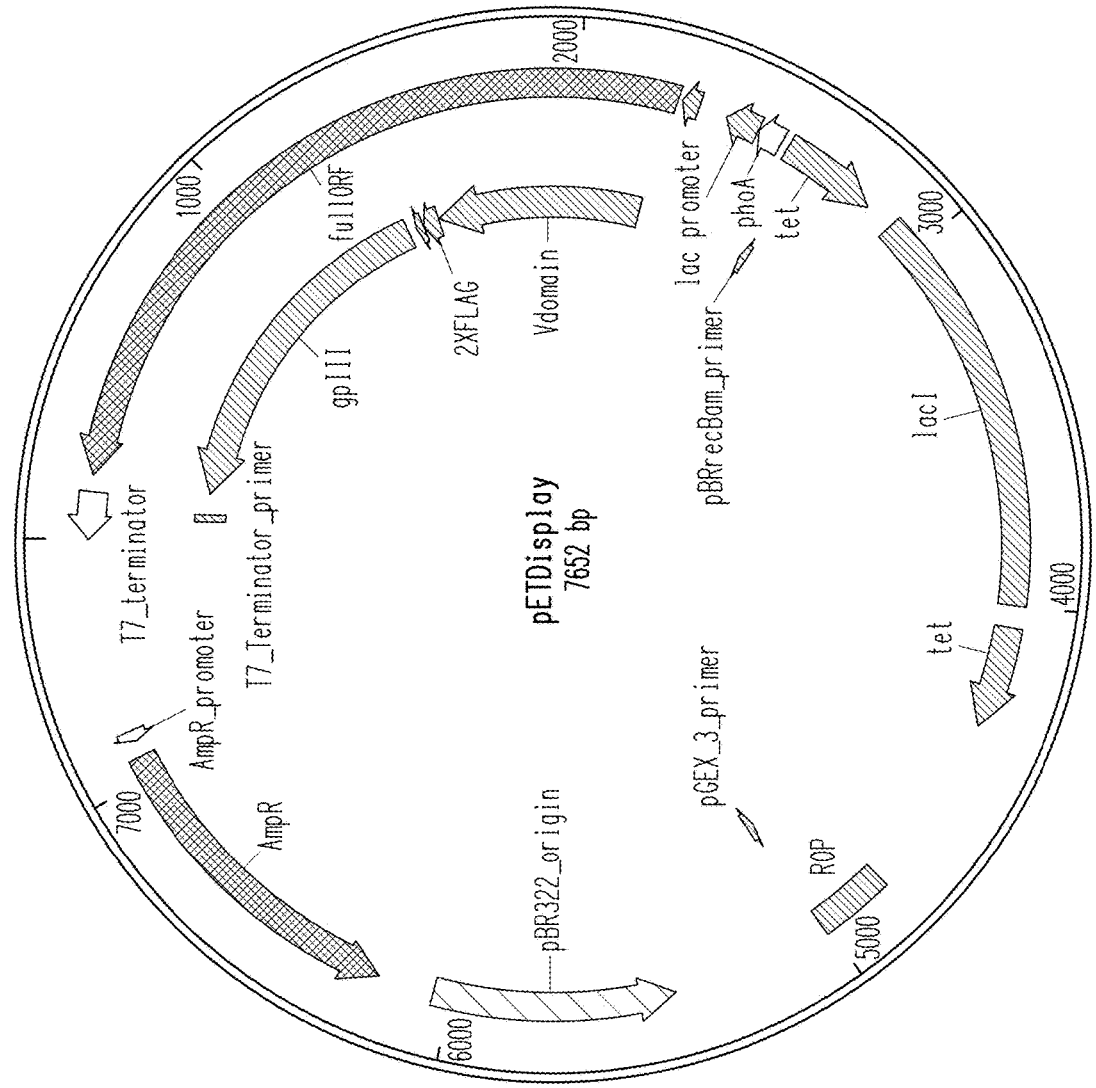
FIG. 6A depicts an example of phage display vector that can be used to produce phage and used in antibody selection application of the invention.
Figure 6B:
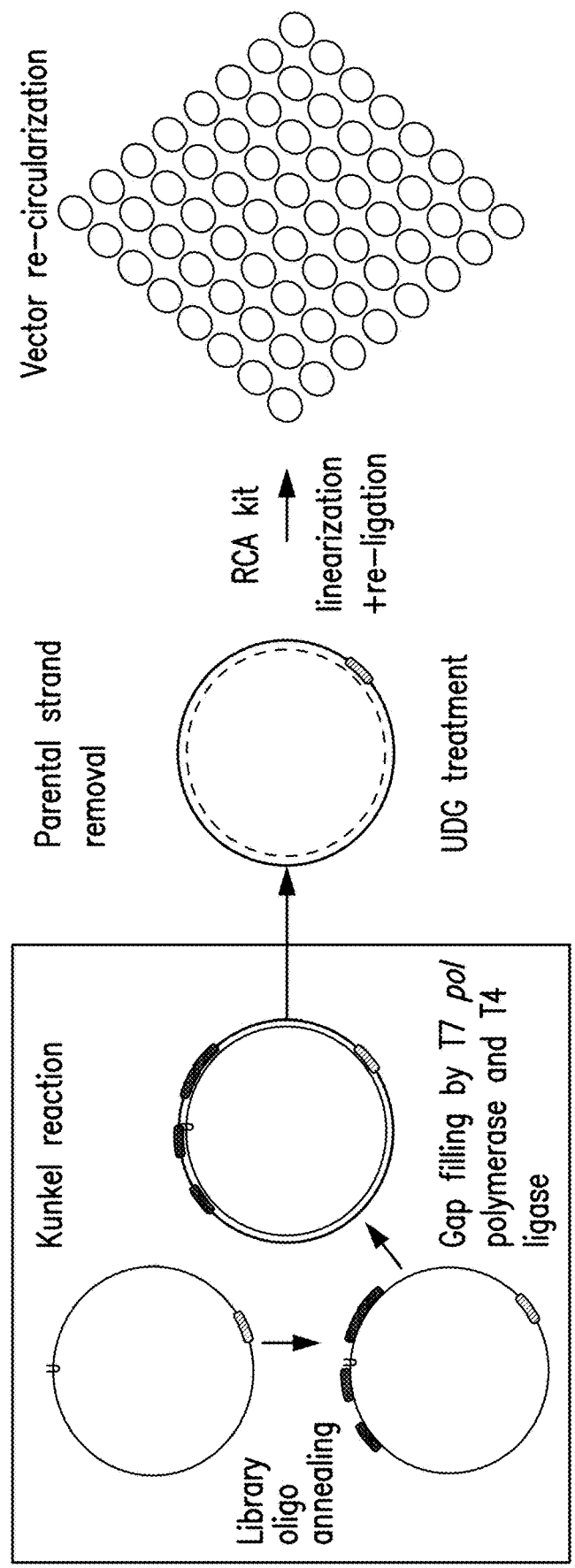
FIG. 6B depicts an example of molecular biology process of designing and construction phage libraries and use the library in antibody selection application of the invention as a typical Kunkel mutagenesis-based library generation process.
Figure 6C:
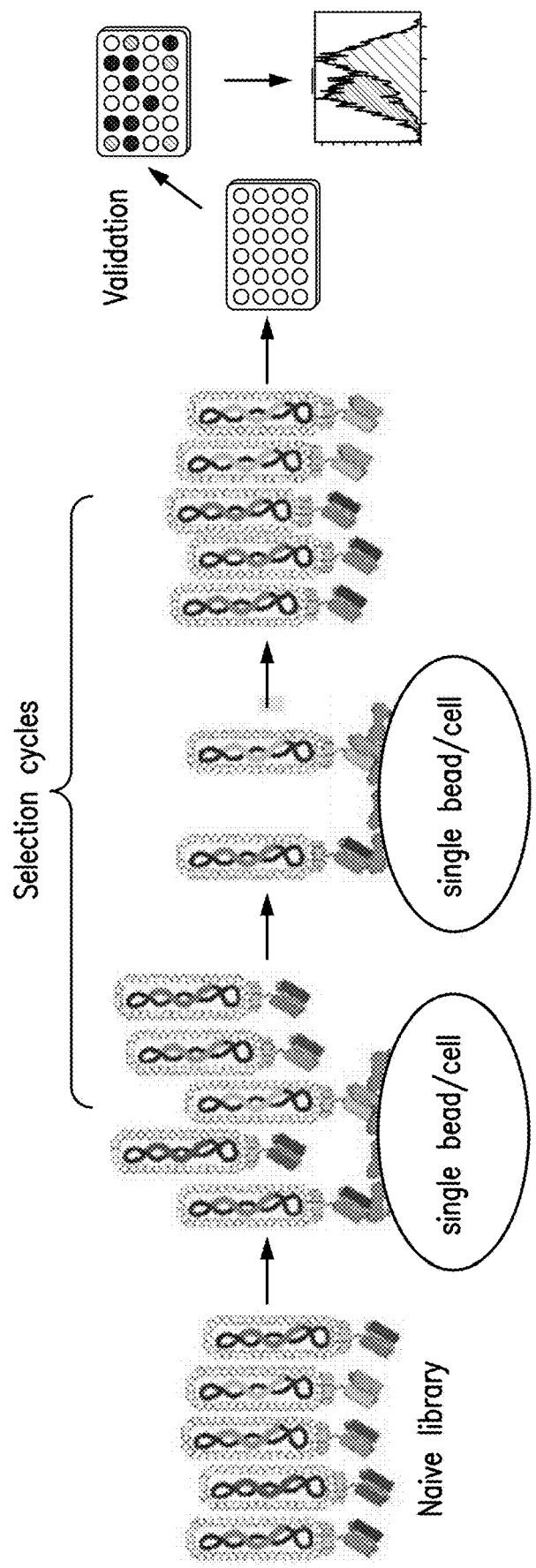
FIG. 6C depicts an example of using this invention in single bead/cell based phage display pipeline.

Experimental design and expected outcome. (A) Library Design. Camel germline VH sequences will be aligned to available nanobody sequences. And cloned as the framework of a nanobody library, as shown in FIG. 6A. Based on NGS analysis of available camel immune repertoire sequences, site-specific amino acid diversities are calculated. 13 positions at CDRH1 and CDRH2 (H27, H29, H31A, H31B, H31C, H52, H52A, H52B, H53, H54 and H56), 8 positions at CDRH3 (H95, H96, H97, H98, H99, H100, H100A and H100B) are chosen as potential randomization sites. (B) Library Construction. To construct the libraries, we will incorporate frameshift in the complementarity determining regions (CDRs) that are targeted for mutagenesis, as shown in FIG. 6B, and then will employ a Kunkel-based site directed mutagenesis, as shown in FIG. 6B, to replace these frameshifted sites with tri-oligonucleotides encoding naturally distributed sets of residues at the chosen CDR positions in Kabat database. The library of nanobody will be displayed on the surface of bacteriophage M13 as a genetic fusion to the gpIII coat protein (1), naïve library with a diversity up to $10^{10}$ will be constructed. (C) Phage display screen on beads, as shown in FIG. 6C. Four cancer immunology targets (EGFR, TIGIT, PD1 and BCMA) will be used as the target of single-particle panning screening, 10 micrograms of purified, C terminal-biotinylated protein will be purchased from commercial vendors and coated to streptavidin beads (50-micron *Creative Diagnostics* catalog No. WHM-S179 and 10-micron WHM-S110).

For each selection, the target protein on 50-micron beads will be spiked in to 100-fold more 10-micron beads coated with the other three proteins. 2000 beads pool will be incubated with the naïve phage library and loaded to our sorting microscope after washing, and 10 large particles will be picked and phage will be recovered via trypsin elution. A total of three rounds of selection will be performed. (D) Phage display screen on cells. In parallel to beads panning, we will evaluate our selection system using single cells that transiently express target proteins. Target cells will be spiked into 100-fold Hela cells, 200 cells pool will be incubated with phage library and loaded for sorting. As HEK293 cells are smaller than Hela cells, we will select 10 small cells identified under microscope and sort them out for phage elution. (E) Antibody characterization. 440 or more individual clones isolated from the screen will be analyzed by phage ELISA. Clones with an ELISA signal >2-fold over background will be expressed in *E. coli* and purified by metal affinity chromatography. (F) Antibody validation. The soluble nanobodies will be further validated by whole cell ELISA on cells transiently expressed target cells and parental HEK293FS cells.

Example 4—Selection of Tumor Killing Lymphocytes

Figure 7A:
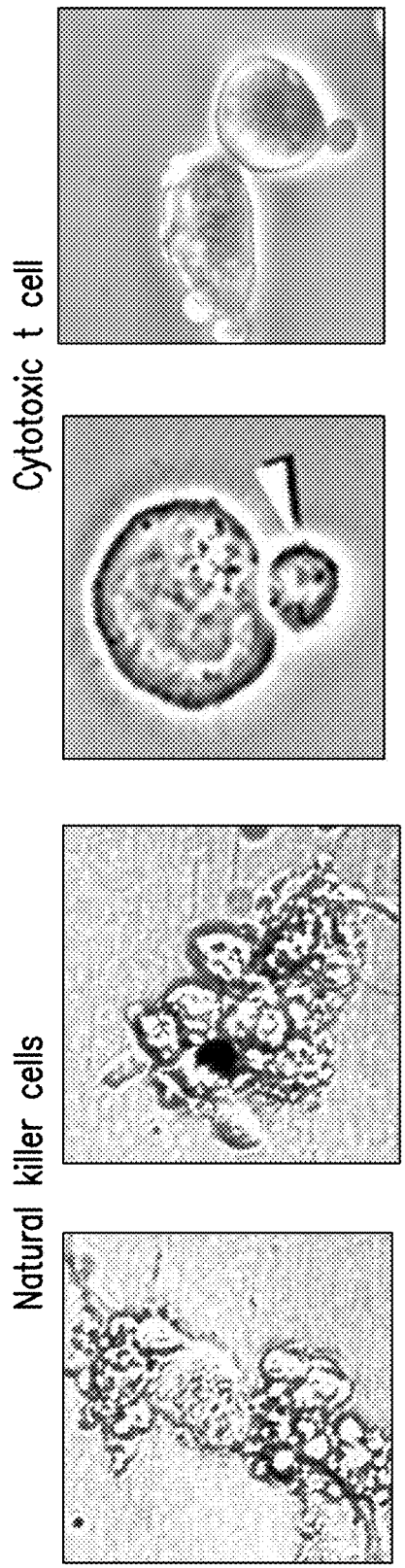
FIGS. 7A-7B depict a selection of tumor killing clones by cellular interaction phenotype.
Figure 7B:
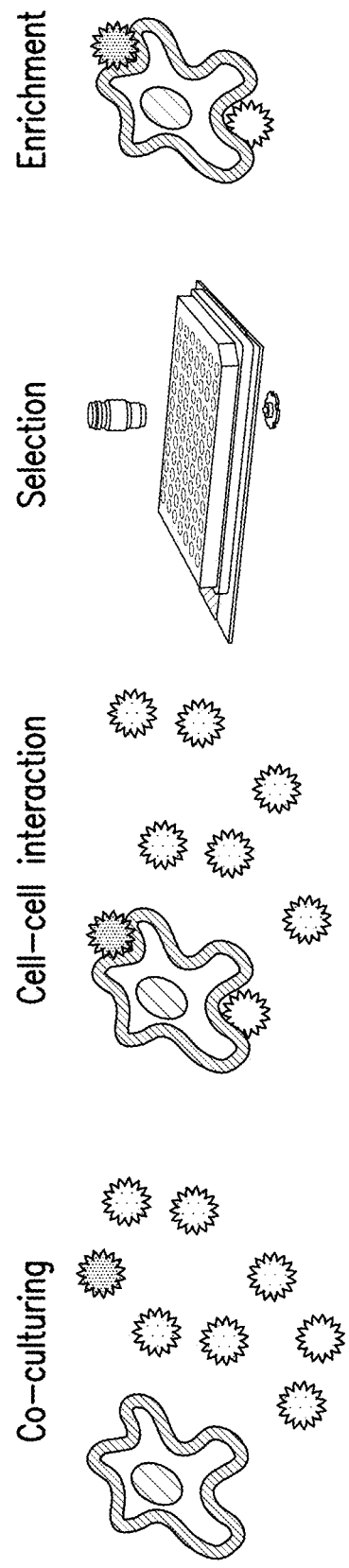

Cellular interaction is the first step of cell-based tumor killing, as shown in FIG. 7A, however, cellular interaction information has not been utilized for current processes, since the common practice starts from bulk removal of non-immune cells. As a proof of concept, we will apply our cell selection method in commercially available CART assay controls, and then utilize the adapted process to obtain tumor killing clones from the cancer maker binders, as shown in FIG. 7B.

Choice of target. A commercially available CART—Tumor cell system (EGFR scFv-CD28-CD3ζ CAR-T cells from (ProMab Cat. No. PM-CAR1021-10M), and EGFR tumor lines from ATCC® EGFR Genetic Alteration Cell Panel (TCP-1027™)) will be chosen to evaluated the level of enrichment by selection on slide.

Experimental Design and Outcome. (A) CAR-T cell enrichment using commercial CART systems. Two tumor cell lines of different EGFR expression status will be used as target cells: 1) HCC827 cells, which contain high EGFR copy number amplification and 2) NCI-H460 cells, which contain zero EGFR copy number amplification. HCC827 and NCI-H460 cell lines will be cultured following recommended protocols. All cells will be harvested using Accutase® (Corning Cat. No. 25-058-CI). Cells will be transduced using KILR Retroparticles for Adherent Cells (DiscoverX Cat. No. 97-003). CAR-T cells will be purchased from ProMab Biotechnologies. This study utilized EGFR scFv-CD28-CD3ζ CAR-T cells which are engineered to target EGFR with a single chain variable fragment (scFv)

and contain a CD3ζ antigen recognition domain and a CD28 co-stimulatory domain. Mock ScFV control CAR-T cells (ProMab Cat. No. PM-CAR1000-1M) will be transduced with an empty vector. Both ScFV CART cells will mix with mock ScFv CART cells with a ratio 1:10. And the mixture of T cell will further mix with tumor cells with a ratio of 1:1. 3000 cells will be cultured in 96 well plate for 4 days and 10, 20, 40, 50 T cells that adhere to tumor cells will be selected and eluted from multiple wells. Cellular RNA will be extracted and reverse translated and submit to NGS sequencing using primers targeting scFc regions. Enrichment of target scFv-CART will be quantified by comparing pre- and post-mRNA ratios of cognate ScFv over mock ScFv vector. (B) Discovery screening for CAR-T clones. Externally enriched EGFR scFv collections from in vitro display methods will be reformatted to CAR-T-lentivirus vector via cloning, and a pool of CART cells will be generated, cocultured with HCC827 and NCI-H460 cell lines and sorted using our Selection-under-Microscope pipeline. 100 viable CART clones will be expanded and validated for tumor cell cytotoxicity.

Example 5—Selecting Cells with Specific Morphologies Due to Cellular Activities

Cells will undergo morphological changes for different functional or developmental activities can be analyzed and separated using the present invention. The method can be used to select and isolate cells based on organelle translocation, chromatin morphology, phagocytosis, synapse formation and protein co-localization.

Example 6—Selecting Beads Coated with DNA

DNA coated beads have been widely used in hybridization experiment. The method can be used to isolate an entity carrying a specific DNA sequence.

Example 7—Selecting Hybridoma Clones

The method can be used in selecting specific hybridoma clones when coated with target antigen conjugated with dyes.

Example 8—Selecting Micro-Droplets

Micro-droplets, such as water-in-oil emulsions are popular microenvironments for encapsulated cells and other materials for high-throughput multiplex analysis. Even though the droplet is liquid, a hydrogel shell can be formed to capture the entire droplet. Therefore, the method can be used in selecting droplets of interest in an emulsion environment, where cells, beads and proteins can be trapped in a microscopic droplet, and the droplet can then be captured by a shell of cured hydrogel produced using the systems and methods of the present invention.

REFERENCES

The following references have been cited above corresponding to the following numbering.
1. Cho S H, Chen C H, Tsai F S, Lo Y H. Micro-fabricated fluorescence-activated cell sorter. Conf Proc IEEE Eng Med Biol Soc. 2009; 2009:1075-8.
2. Herzenberg L A, Parks D, Sahaf B, Perez O, Roederer M, Herzenberg L A. The history and future of the fluorescence activated cell sorter and flow cytometry: a view from Stanford. Clin Chem. 2002; 48(10):1819-27.
3. Ungai-Salanki R, Gerecsei T, Furjes P, Orgovan N, Sandor N, Holczer E, et al. Automated single cell isolation from suspension with computer vision. Sci Rep. 2016; 6:20375.
4. Liu Y., Sonek G. J., Berns M. W., Tromberg B. J. Physiological monitoring of optical trapped cells: Assessing the effects of confinement by 1064-nm laser tweezers using microfluorometry. Biophys. J. 1996; 71:2158-2167. doi: 10.1016/S0006-3495(96)79417-1.
5. Espina V, Heiby M, Pierobon M, Liotta L A. Laser capture microdissection technology. Expert Rev Mol Diagn. 2007; 7(5):647-57.
6. Zhao J, Li X, Luo Q, Xu L, Chen L, Chai L, et al. Screening of surface markers on rat intestinal mucosa microfold cells by using laser capture microdissection combined with protein chip technology. Int J Clin Exp Med. 2014; 7(4):932-9.
7. Hamilton N A, Pantelic R S, Hanson K, Teasdale R D. Fast automated cell phenotype image classification. BMC Bioinformatics. 2007; 8:110.
8. Gungor-Ozkerim P S, Inci I, Zhang Y S, Khademhosseini A, Dokmeci M R. Bioinks for 3D bioprinting: an overview. Biomater Sci. 2018; 6(5):915-46.
9. Leelatian N, Doxie B, et al Preparing Viable Single Cells from Human Tissue and Tumors for Cytomic Analysis Current Protocols in Molecular Biology UNIT 25C.1 Curr Protoc Mol Biol. 2017 Apr. 3; 118: 25C.1.1-25C.1.23.
10. Smith G P. Filamentous fusion phage: novel expression vectors that display cloned antigens on the virion surface. Science. 1985; 228(4705):1315-7.
11. Bazan J, Calkosinski I, Gamian A. Phage display—a powerful technique for immunotherapy: 1. Introduction and potential of therapeutic applications. Hum Vaccin Immunother. 2012; 8(12):1817-28.
12. Zhou J, Dudley M E, Rosenberg S A, Robbins P F. Selective growth, in vitro and in vivo, of individual T cell clones from tumor-infiltrating lymphocytes obtained from patients with melanoma. J Immunol. 2004; 173(12):7622-9.
13. Ferreira M M, Ramani V C, Jeffrey S S. Circulating tumor cell technologies. Mol Oncol. 2016; 10:374-94.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS AND SCOPE

Those skilled in the art will recognize, or be able to ascertain using no more than routine experimentation, many equivalents to the specific embodiments of the invention described herein. The scope of the present invention is not intended to be limited to the above Description.

The invention can be embodied in other specific forms without departing from the spirit or essential characteristics thereof. The foregoing embodiments are to be considered in all respects illustrative rather than limiting on the invention described herein. In the various embodiments of the methods and systems of the present invention, where the term comprises is used with respect to the recited steps of the methods or components of the compositions, it is also contemplated that the methods and compositions consist essentially of, or consist of, the recited steps or components. Furthermore, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances a composition can be described as being composed of the components prior to mixing, because upon mixing certain components can further react or be transformed into additional materials.

All percentages and ratios used herein, unless otherwise indicated, are by weight.

What is claimed is:

1. A system for segregating particles from a sample prepared in a light-curable polymeric medium, comprising:
    a light transparent sample plate having one or more receptacles for containing the sample,
    a light-curable polymeric medium,
    a light emitting diode (LED) light source for curing the light-curable polymeric medium,
    a liquid crystal display (LCD) having an array of pixels for selectively illuminating and controlling the transmission of light to the sample, wherein each pixel comprises two or more sub-pixels,
    a sample stage for aligning the sample plate and the LCD with respect to each other,
    an objective for observing the sample by microscopy,
    a camera for capturing images obtained from the microscopy,
    a means for removing segregated particles from the sample, and
    a microprocessor and software for controlling the system.

2. The system according to claim 1 wherein the light transparent sample plate is a 96-well plate.

3. The system according to claim 1 wherein each pixel of the LCD array comprises a green light emitting sub-pixel, a red light emitting sub-pixel, and a blue light emitting sub-pixel.

4. The system according to claim 1 wherein each pixel has a dimension of about 60 µm by about 60 µm and each subpixel has a dimension of about 20 µm by about 60 µm.

5. The system according to claim 1 wherein the array of pixels comprises a rectangular array of from about 500 pixels to about 10,000 pixels by about 500 pixels to about 10,000 pixels.

6. The system according to claim 5 wherein the rectangular array of pixels comprises a rectangular array from about 1500 pixels by about 2400 pixels.

7. The system according to claim 1 wherein the LED light source emits white light.

8. The system according to claim 1 wherein the LED light source emits white light having a wavelength from about 390 nm to about 700 nm.

9. The system according to claim 1 wherein the LED light source emits blue/violet light having a wavelength from about 390 nm to about 490 nm.

10. The system according to claim 1 wherein the LED light source emits green light having a wavelength from about 520 nm to about 560 nm.

11. The system according to claim 1 wherein the LED light source emits red light having a wavelength from about 635 nm to about 700 nm.

12. The system according to claim 1 wherein the LED light source emits ultraviolet light having a wavelength from about 290 nm to about 390 nm.

13. The system according to claim 1 wherein the LCD is oriented between the sample plate and the LED.

14. The system according to claim 1 wherein the LCD is located under the sample plate and the LED is located under the LCD.

15. The system according to claim 1 wherein the objective for observing the sample by microscopy is located above the sample plate.

16. The system according to claim 1 wherein the means for removing segregated particles from the sample is selected from pipetting, washing, rinsing, and suction.

17. The system according to claim 1 wherein the sample is a biological sample.

18. The system according to claim 17 wherein the biological sample is selected from cells, biological particles, beads, extracellular material, and liquid droplets.

19. The system according to claim 18 wherein the cells are selected from circulating tumor cells (CTCs), blood cells, bacteria, primary cells, transformed cells, pathogenic cells, and rare immune cells.

20. The system according to claim 1 wherein the light-curable polymeric medium is selected from a photo-reactive polymer that demonstrates an increase in viscosity when exposed to a light source having a wavelength from about 290 to about 400 nm.

21. The system according to claim 20 wherein the light-curable polymeric medium comprises photo-initiators, gelatin derivatives, poly-ethylene glycol derivatives, alginate and its derivatives, collagen and its derivatives, Pluronic® and its derivatives, and mixtures thereof.

22. The system according to claim 1 wherein the LED comprises a light source combination for generating an optic array pattern.

23. The system according to claim 22 wherein the LED is selected from a light projector or an organic light-emitting diode (OLED).

* * * * *